US010051148B2

(12) United States Patent
Han et al.

(10) Patent No.: US 10,051,148 B2
(45) Date of Patent: Aug. 14, 2018

(54) CLOUD SERVER, IMAGE FORMING APPARATUS AND METHOD FOR TRANSMITTING FAX

(71) Applicant: S-Printing Solution Co., Ltd., Suwon-si, Gyeonggi-do (KR)

(72) Inventors: Chang-min Han, Ansan-si (KR); Jeong-jin Park, Yongin-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days.

(21) Appl. No.: 15/360,081

(22) Filed: Nov. 23, 2016

(65) Prior Publication Data

US 2017/0163842 A1 Jun. 8, 2017

(30) Foreign Application Priority Data

Dec. 8, 2015 (KR) ........................ 10-2015-0173892

(51) Int. Cl.
*H04M 11/00* (2006.01)
*H04N 1/32* (2006.01)
(Continued)

(52) U.S. Cl.
CPC ....... *H04N 1/32534* (2013.01); *H04L 61/106* (2013.01); *H04L 67/10* (2013.01); *H04N 1/0022* (2013.01); *H04N 1/00206* (2013.01); *H04N 1/00244* (2013.01); *H04N 1/00344* (2013.01); *H04N 1/32* (2013.01); *H04N 1/32117* (2013.01); *H04N 2201/0039* (2013.01); *H04N 2201/0093* (2013.01);
(Continued)

(58) Field of Classification Search
CPC ............ H04N 1/32534; H04N 1/0022; H04N 1/32117; H04N 1/00344; H04N 1/00206; H04N 2201/0093; H04N 2201/0039; H04N 2201/3205; H04N 2201/3208; H04N 2201/3209; H04N 2201/0094; H04L 61/106; H04L 67/10
USPC .................................................... 379/100.13
See application file for complete search history.

(56) References Cited

U.S. PATENT DOCUMENTS 6,052,445 A 4/2000 Bashoura et al.
6,058,169 A 5/2000 Bramnick et al.
(Continued)

FOREIGN PATENT DOCUMENTS

JP 2014-017732 A 1/2014
KR 10-2012-0038870 A 4/2012
(Continued)

*Primary Examiner* — Stella Woo
(74) *Attorney, Agent, or Firm* — Jefferson IP Law, LLP

(57) ABSTRACT

A cloud server is provided. The cloud server includes a transceiver configured to receive, from an electronic device, a fax transmission request and at least one processor configured to control the transceiver to determine a communication network among a plurality of communication networks for communication with an opponent image forming apparatus corresponding to the fax transmission request, when the opponent image forming apparatus is a pre-registered apparatus and transmit fax data corresponding to the fax transmission request to the opponent image forming apparatus using the determined communication network, when the opponent image forming apparatus is a pre-registered apparatus.

18 Claims, 15 Drawing Sheets

(51) Int. Cl.
*H04L 29/12* (2006.01)
*H04L 29/08* (2006.01)
*H04N 1/00* (2006.01)

(52) U.S. Cl.
CPC ............... *H04N 2201/0094* (2013.01); *H04N 2201/3205* (2013.01); *H04N 2201/3208* (2013.01); *H04N 2201/3209* (2013.01)

(56) References Cited

U.S. PATENT DOCUMENTS

| | | | |
|---|---|---|---|
| 2010/0002268 A1* | 1/2010 | Sawano | H04N 1/0022 358/442 |
| 2013/0346522 A1* | 12/2013 | Lennstrom | H04L 51/14 709/206 |
| 2014/0268219 A1* | 9/2014 | Ho | H04N 1/00209 358/1.15 |
| 2014/0307294 A1 | 10/2014 | Rebert | |
| 2015/0038086 A1 | 2/2015 | Kim | |
| 2015/0099502 A1 | 4/2015 | Park et al. | |

FOREIGN PATENT DOCUMENTS

| | | |
|---|---|---|
| KR | 10-2013-0047326 A | 5/2013 |
| KR | 10-2014-0055377 A | 5/2014 |
| KR | 10-2015-0015774 A | 2/2015 |
| KR | 10-2015-0040669 A | 4/2015 |
| KR | 10-1510318 B1 | 4/2015 |

\* cited by examiner

CLOUD SERVER, IMAGE FORMING APPARATUS AND METHOD FOR TRANSMITTING FAX

CROSS-REFERENCE TO RELATED APPLICATION(S)

This application claims the benefit under 35 U.S.C. § 119(a) of a Korean patent application filed on Dec. 8, 2015 in the Korean Intellectual Property Office and assigned Serial number 10-2015-0173892, the entire disclosure of which is hereby incorporated by reference.

TECHNICAL FIELD

The present disclosure relates to a cloud server, an image forming apparatus, and a method for transmitting a facsimile (hereinafter fax). More particularly, the present disclosure relates to a cloud server, an image forming apparatus, and a method for transmitting the fax capable of selectively transmitting the fax through the internet network along a communication network connected to a fax receiving side.

BACKGROUND

Generally, an image forming apparatus refers to an apparatus that prints image data generated from a terminal device like a computer on a recording sheet. An example of the image forming apparatus may include a copier, a printer, a fax device, a multifunction peripheral (MFP) in which functions such as faxing, copying, and printing are compositely implemented in one apparatus, etc.

For the image forming apparatus to be operated as the fax device, a fax module connected to a public switched telephone network (PSTN) network is required. On the other hand, when the image forming apparatus does not include the fax module, the image forming apparatus may not perform the fax operation.

Furthermore, an electronic fax application executing in a user terminal may transmit and receive a fax without the need of a separate fax machine. However, when a user wants to send a hard copy document by fax using such electronic fax application, a complicated process of scanning, by the user, the hard copy of the document using an image forming apparatus supporting a scan function, sending the scanned result to the user terminal, and performing a fax transmission using the electronic fax application in the user terminal is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure provides a cloud server, an electronic device, and a method for transmitting a fax by selectively transmitting the fax by a cloud server through an internet network along a communication network connected to a fax receiving side.

In accordance with an aspect of the present disclosure, a cloud server is provided. The cloud server includes a transceiver configured to receive, from an electronic device, a fax transmission request, and at least one processor configured to control the transceiver to determine a communication network among a plurality of communication networks for communication with an opponent image forming apparatus corresponding to the fax transmission request, when the opponent image forming apparatus is a pre-registered apparatus, and transmit fax data corresponding to the fax transmission request to the opponent image forming apparatus using the determined communication network, when the opponent image forming apparatus is a pre-registered apparatus.

The cloud server may further include a storage configured to store a mapping table for mapping a plurality of image forming apparatuses to at least one of a fax address and an internet address, wherein the at least one of the fax address and the internet address is connected to an internet network, and wherein the at least one processor is further configured to determine that the opponent image forming apparatus is a pre-registered apparatus when a fax address or an internet address of the opponent image forming apparatus corresponding to the fax transmission request is mapped in the mapping table.

The internet address mapped in the mapping table is one of an internet protocol (IP) address, a medium access control (MAC) address, and a virtual telephone number.

The at least one processor may control the transceiver to notify the electronic device of a determination result on whether the opponent image forming apparatus is a pre-registered apparatus.

The processor may control the transceiver to transmit user authentication information with the fax data to the opponent image forming apparatus when the determined communication network is an internet network.

The transceiver may receive data from the electronic device through an internet network.

The cloud server may further include an image processor configured to convert the received data into the fax data.

The image processor may convert into a fax format when the determined communication network is a public switched telephone network (PSTN) network, and convert the received data into a printing format when the determined communication network is the internet network.

The transceiver may transmit the fax data of the fax format through a PSTN network when the determined communication network is the PSTN network, and transmit the fax data of the printing format through the internet network when the determined communication network is the internet network.

The cloud server may further include a storage configured to store a history of the fax transmission request.

The plurality of communication networks may include a PSTN network and an internet network.

The electronic device may include one of a user terminal device or an image forming apparatus.

According to another aspect of the present disclosure, an electronic device connected to a cloud server is provided. The electronic device includes an input interface configured to receive fax address information of an opponent image forming apparatus, a transceiver configured to transmit the fax address information to the cloud server and receive a determination result on whether the opponent image forming apparatus is a pre-registered apparatus, a display configured to display the received determination result, a scanner configured to scan a manuscript to generate a scan image, and at least one processor configured to control the transceiver to transmit the generated scan image to the cloud server when the opponent image forming apparatus is pre-registered in the cloud server.

The electronic device may further include a fax device configured to transmit the generated scan image to the opponent image forming apparatus through the PSTN network when the opponent image forming apparatus is not pre-registered in the cloud server. The electronic device may further include an image former, wherein the transceiver is further configured to receive fax data from the cloud server, and wherein the image former is configured to print the fax data received from the cloud server. The electronic device may further include a storage configured to store the fax data and user information from the cloud server, wherein the at least one processor is configured to control the image former to print the fax data stored in the storage when authentication information corresponding to the user information is input.

In accordance with an aspect of the present disclosure, a method for transmitting fax by a cloud server is provided. The method includes receiving, by a transceiver, a fax transmission request from an electronic device, determining, by at least one processor, a communication network among a plurality of communication networks for communication with an opponent image forming apparatus corresponding to the fax transmission request, when the opponent image forming apparatus is a pre-registered apparatus, and transmitting fax data corresponding to the fax transmission request to the opponent image forming apparatus using the determined communication network, when the opponent image forming apparatus is a pre-registered apparatus.

In the determining, it may be determined that the opponent image forming apparatus is a pre-registered apparatus when a fax address or an internet address of the opponent image forming apparatus corresponding to the fax transmission request is mapped in a pre-stored mapping table for mapping a plurality of image forming apparatuses to at least one of a fax address and an internet address internet.

The internet address mapped in the mapping table is one of an internet protocol (IP) address, a medium access control (MAC) address, and a virtual telephone number.

The method may further include notifying the electronic device of a determination result on whether the opponent image forming apparatus is a pre-registered apparatus.

The electronic device is one of a user terminal device or an image forming apparatus In the method, receiving the fax transmission request includes receiving data from the electronic device through an internet network, the method further comprising converting the received data into a fax format when the determined communication network is a public switched telephone network (PSTN) network, and converting the received data into a printing format when the determined communication network is the internet network.

The method may further include transmitting the fax data of the fax format through the PSTN network when the determined communication network is the PSTN network, and transmit the fax data of the printing format through the internet network when the determined communication network is the internet network In a computer-readable recording medium including a program executing a method for transmitting fax, the method for transmitting fax includes receiving a fax address of an opponent image forming apparatus to which data are transmitted, transmitting the input fax address information to a cloud server, receiving registration information on whether to be pre-registered in the cloud server of the opponent image forming apparatus, corresponding to the fax address information, and displaying the received pre-registered information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages certain embodiments of the present disclosure will be more apparent from the following description taken in conjunction the accompanying drawings, in which.

Throughout the drawings, like reference numerals will be understood to refer to like parts, components, and structures.

DETAILED DESCRIPTION OF THE EXEMPLARY EMBODIMENTS

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms 'first', 'second', and the like, may be used to describe various components, but the components are not to be construed as being limited by the terms. The terms are used to distinguish one component from another component.

Terms used in the present specification are used only in order to describe specific embodiments rather than limiting the scope of the present disclosure. Singular forms are intended to include plural forms unless the context clearly indicates otherwise. It will be further understood that the terms "comprises" or "configured of" used in this specification, specify the presence of features, numerals, operations, components, parts mentioned in this specification, or a combination thereof, but do not preclude the presence or addition of one or more other features, numerals, operations, components, parts, or a combination thereof.

In the embodiments, a 'module' or a 'unit' may perform at least one function or operation, and be implemented by hardware or software or be implemented by a combination of hardware and software. In addition, a plurality of 'modules' or a plurality of 'units' may be integrated in at least one module and be implemented by at least one processor (not illustrated) except for a 'module' or a 'unit' that needs to be implemented by specific hardware.

Hereinafter, the present disclosure will be described in detail with reference to the accompanying drawings.

Figure 1:
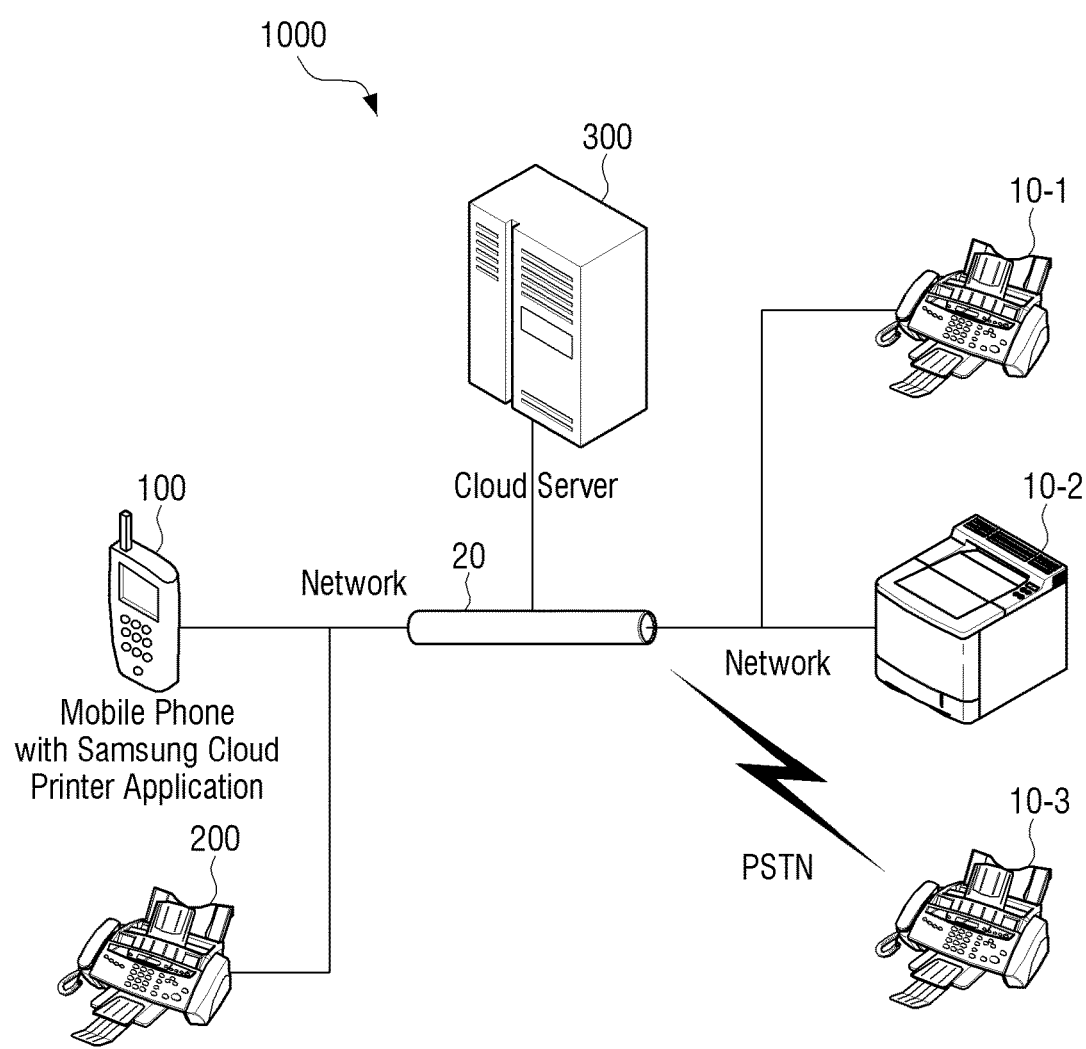
FIG. 1 is a diagram illustrating an image forming system according to an embodiment of the present disclosure.

FIG. 1 is a diagram illustrating an image forming system according to an embodiment of the present disclosure.

Referring to FIG. 1, an image forming system 1000 according to an embodiment of the present disclosure may be configured to include a user terminal device 100, an image forming apparatus 200, and a cloud server 300.

The cloud server 300 may perform jobs based on telephone numbers. Here, a method for performing a job based on a telephone number includes mapping telephone numbers to image forming apparatus or mobile terminal and registering them in the cloud server 300. That is, instead of directly selecting a network address of an apparatus for performing printing (or fax transmission), a job is sent to a pre-registered telephone number to perform the printing (or fax transmission). The cloud server 300 that supports the job performance based on the telephone number may be called a Samsung cloud printer (SCP) server, and the job performance based on the telephone number may be called an SCP function.

Further, when receiving a fax transmission request from the user terminal device 100 or from the image forming apparatus 200, the cloud server 300 may determine whether an opponent image forming apparatus included in the fax transmission request (i.e., a destination image forming apparatus) is one of pre-registered apparatuses 10-1 and 10-2. Further, the cloud server 300 may determine a communication network to be used for communication with the opponent image forming apparatus among a plurality of communication networks depending on whether the opponent image forming apparatus is one of the pre-registered apparatus. Here, the fax transmission request may include fax address information (for example, a telephone number) to identify the opponent image forming apparatus. Further, the foregoing communication network may include a public switched telephone network (PSTN) network and an internet network. Here, the PSTN network is a communication network using an international telephone system for transmitting and receiving voice data, and the internet network is a communication network accessing the internet through which computers of the world may be connected to each other to exchange information. As an example of the communication network, the PSTN and the internet network are described above. However, in addition to the foregoing communication network, other communication networks that may transmit fax data may also be used.

Further, the cloud server 300 may notify the user terminal device 100 or the image forming apparatus 200 transmitting the fax transmission request of the foregoing determination result. Further, when the opponent image forming apparatus is one of the pre-registered apparatuses, i.e., one of apparatuses 10-1 and 10-2, the cloud server 300 may transmit the fax data to the opponent image forming apparatus through the internet network. If, on the other hand, it is determined that the opponent image forming apparatus is not one of the pre-registered apparatuses, e.g., the opponent image forming apparatus is apparatus 10-3, the cloud server 300 may transmit the fax data to the corresponding opponent image forming apparatus (i.e., apparatus 10-3) through the PSTN network. The detailed function and operation of the cloud server 300 will be described below with reference to FIGS. 6 and 7.

Here, one or more of the image forming apparatuses 10-1, 10-2, and 10-3 may be image forming apparatuses according to embodiments of the present disclosure or may be existing image forming apparatuses. For example, in the example illustrated, the image forming apparatuses 10-1 and 10-2 may be apparatuses that may transmit and receive the fax data through the internet network according to embodiments of the present disclosure, and the image forming apparatus 10-3 may be an existing image forming apparatus that may transmit and receive the fax data only through the PSTN network.

Thus, in embodiments of the present disclosure, the user terminal device 100 or the image forming apparatus 200 may receive a fax address information of the opponent image forming apparatus, transmit the received fax address information to the cloud server 300, and receive a determination result on whether the opponent image forming apparatus is a pre-registered apparatus. Further, the user terminal device 100 or the image forming apparatus 200 may display the received determination result.

Further, the user terminal device 100 or the image forming apparatus 200 may request a fax data transmission to the cloud server 300 depending on a user confirmation result. The detailed function and operation of the user terminal device 100 will be described below with reference to FIGS.

2 and 4. Further, the detailed function and operation of the image forming apparatus 200 will be described below with reference to FIG. 5.

As described above, the image forming system 1000 according to an embodiment of the present disclosure may perform a fax transmission even when a corresponding user terminal device or image forming apparatus does not include a fax module, thereby improving user convenience. Further, the image forming system 1000 according to the embodiment of the present disclosure transmits the fax data through the internet network, thereby saving a communication fee. Further, the image forming system 1000 may transmit the fax data without using a fax format, and therefore may transmit the fax data with a higher quality of image higher than what is supported by the fax format.

Meanwhile, in describing FIG. 1, the image forming system 1000 including both of the user terminal device 100 and the image forming apparatus 200 is illustrated, but in the implementation, the image forming system may be configured to include only the user terminal device 100 and the cloud server 300 or only the image forming apparatus 200 and the cloud server 300.

Further, in describing FIG. 1, the apparatuses are illustrated and described as being directly connected to one another, but in the implementation, each of the apparatuses may be indirectly connected to one another through a router, other apparatuses (for example, server), or the like. Further, the illustrated example describes some of the apparatuses connected to one another by a wired line, but in the implementation, some or all of the apparatuses may be connected to one another wirelessly.

Further, in describing FIG. 1, the cloud server 300 is illustrated and described as one apparatus, but the cloud server 300 may also be implemented as a plurality of apparatuses. Further, one server of the plurality of servers may be a server that distributes and processes a printing job based on a telephone number.

Figure 2:
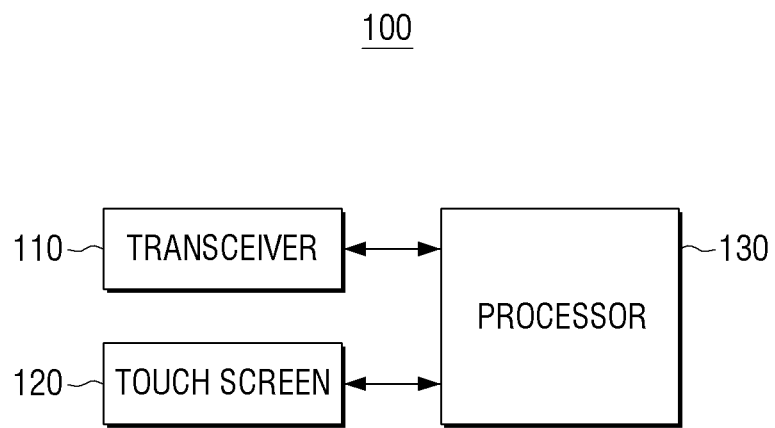
FIG. 2 is a block diagram illustrating a simple configuration of a user terminal device of FIG. 1 according to an embodiment of the present disclosure.

FIG. 2 is a block diagram illustrating a simple configuration of a user terminal device of FIG. 1.

The user terminal device 100 of FIG. 2 may be implemented as various types of devices such as television (TV), a personal computer (PC), a laptop PC, a cellular phone, a tablet PC, a personal digital assistant (PDA), a Moving Picture Experts Group phase 1 or phase 2 (MPEG-1 or MPEG-2) audio layer 3 (MP3) player, a kiosk, and a digital photo frame. When the user terminal device 100 is implemented as portable types of apparatuses such as the cellular phone, the tablet PC, the PDA, the MP3 player, and the laptop PC, it may also be called a mobile device but will be collectively called a user terminal device in the present specification.

Referring to FIG. 2, the user terminal device 100 may be configured to include a transceiver 110, a touch screen 120, and at least one processor 130.

The transceiver 110 may connect the user terminal device 100 to external devices (not illustrated) and may do so through a local area network (LAN), an internet network, or a mobile communication network using any suitable mobile communication technology (for example, global system for mobile communications (GSM), universal mobile telecommunications system (UMTS), long term evolution (LTE), wireless broadband (WiBRO), or the like).

The transceiver 110 transmits fax address information to a cloud server 300. In detail, the transceiver 110 may transmit fax address information input or selected on the touch screen 120 by a user (as will be described below) to the cloud server 300 through the internet network. Here, the fax address information is information that may specify the opponent image forming apparatus and may be the telephone number (that is, a fax telephone number) for the PSTN network connected to the opponent image forming apparatus, but may also be a virtual telephone number allocated to the opponent image forming apparatus, a media access control (MAC) address, an IP address, or the like.

Further, the transceiver 110 receives the determination result on whether the opponent image forming apparatus is a pre-registered apparatus from the cloud server 300. Here, the determination result may be information indicating whether the opponent image forming apparatus is an apparatus registered in the SCP server or is an apparatus not registered in the SCP server, that is, information indicating whether or not the opponent image forming apparatus is an apparatus capable of performing a job based on a telephone number. Alternatively, the determination result may be the information (that is, PSTN network and internet network) on the communication network determined by the cloud server 300.

Further, the transceiver 110 transmits fax data to the cloud server 300. Here, the transmitted fax data may be a pre-created document file, or the like, that is stored in a storage 140 (to be described below), or may be a photographed image generated by an imager 185 (to be described below).

The touch screen 120 may display icons of several applications installed in the user terminal device 100. Further, a user may select any one of the icons of the several applications displayed on the touch screen 120 to execute a corresponding application. If the icon selected by the user is for an SCP application, the touch screen 120 may display a user interface (UI) (e.g., a menu) for selecting functions supported by the SCP application. Here, the SCP application is an application that may use the cloud server 300 to perform a printing job only by a selection of a telephone number and a selection of content.

Further, the touch screen 120 may display multiple pre-stored telephone numbers, and the UI may allow the user to select one of the displayed telephone numbers. In this case, an example of a UI window that may be displayed will be described below with reference to FIG. 9. In this case, when the selected telephone number is a fax number, the operation according to the embodiment of the present disclosure is performed. On the other hand, when the selected telephone number is a general telephone number, the printing function may be performed like the related art. That is, the image forming apparatus mapped to the telephone number selected by the user may perform a printing function.

Meanwhile, in the embodiment of the present disclosure, the user terminal device 100 identifies whether each of several telephone numbers is a fax number or a general telephone number and uses the identified number. However, the present disclosure is not so limited, and an embodiment of the present disclosure may also be implemented such that the user terminal device 100 stores only the information on the telephone number and the cloud server 300 analyses the information and notifies the user terminal device 100 of the result. That is, by only inputting a printing command to a specific telephone number, without separately determining a transmission scheme, the cloud server 300 may automatically transmit content by a PSTN scheme if the corresponding contact is the fax number, or by a printing scheme if the corresponding contact is not a fax number.

Further, the touch screen 120 may display a UI for selecting content to be transmitted and the content may be selected through the displayed UI. In this case, an example of a UI window that may be displayed will be described below with reference to FIG. 8.

Further, the touch screen 120 displays the received determination result. In detail, the touch screen 120 may display the determination result on whether the opponent image forming apparatus corresponding to the fax address received through the transceiver 110 is an apparatus pre-registered in the cloud server 300.

In detail, if the opponent image forming apparatus corresponding to the fax address is not a pre-registered apparatus, the touch screen 120 needs to transmit the content by the PSTN scheme and, therefore, fax transmission costs may be incurred. In this case, the touch screen 120 may additionally display a window for confirming whether the operation is in progress and an option to continue or cancel the operation.

If the opponent image forming apparatus corresponding to the fax address is a pre-registered apparatus, the touch screen 120 may display that the fax may be transmitted through the internet network. Meanwhile, if the opponent image forming apparatus may be connected to through both the PSTN network and the internet network, the user may select in which network the fax data is to be transmitted on the touch screen 120. Preferably, it is advantageous in cost and quality to transmit the fax data through the internet network, and therefore, if the opponent image forming apparatus is a pre-registered apparatus, the operation may continue through the internet network without additional confirmation.

The processor 130 controls each component within the user terminal device 100. In detail, if the user selects the SCP application, the processor 130 may execute the SCP application. If the SCP application is executed, the processor 130 may control the touch screen 120 to display the UI provided by the SCP application.

If the fax address information is received through the UI, the processor 130 controls the transceiver 110 to transmit the fax address information to the cloud server 300. In the implementation, a pre-selected content may also be transmitted along with the fax address information.

If the determination result on whether the opponent image forming apparatus corresponding to the fax address information is pre-registered is received from the cloud server 300, the processor 130 may control the touch screen 120 to display the received determination result.

Further, the processor 130 may control the transceiver 110 to transmit the selected content to the cloud server 300. Meanwhile, if the determined communication network is the PSTN network, the processor 130 may convert content into fax data in a fax format and transmit the fax data to the cloud server 300. On the other hand, the processor 130 may transmit the content to the cloud server 300 without separately converting the content into fax data, and the cloud server 300 may convert the content into fax data.

As described above, the user terminal device 100 according to an embodiment of the present disclosure may transmit a fax even when not including a fax module, thereby improving the user convenience. Further, the user terminal device 100 according to an embodiment of the present disclosure may transmit the fax data through the internet network to save the communication fee and may transmit the fax data without using a fax format to transmit the fax data with higher image quality than what is supported by the fax format.

Meanwhile, only the simple components configuring the user terminal device 100 are illustrated and described above, but in the implementation, various components may be additionally provided. This will be described below with reference to FIG. 3.

Figure 3:
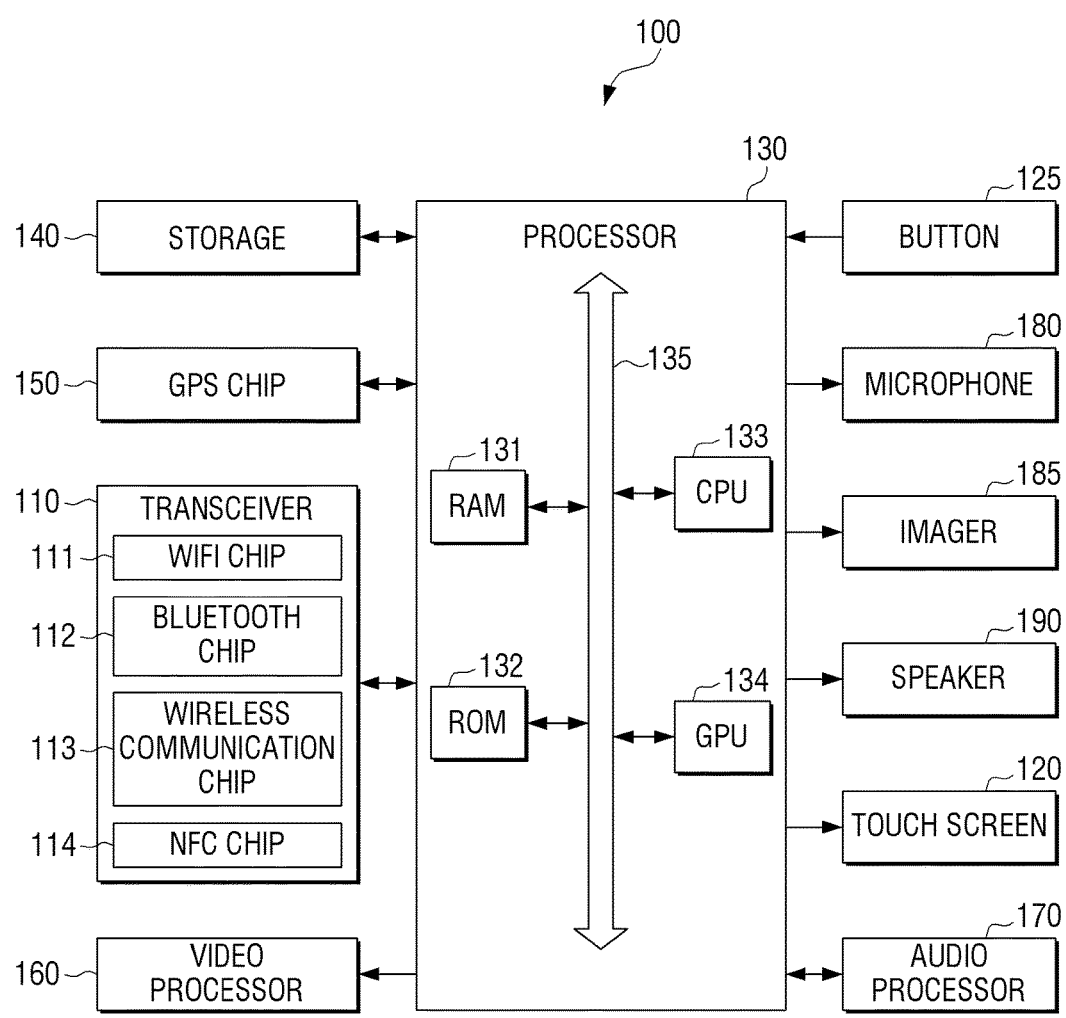
FIG. 3 is a block diagram illustrating a detailed configuration of a user terminal device of FIG. 1 according to an embodiment of the present disclosure.

FIG. 3 is a block diagram illustrating a detailed configuration of a user terminal device of FIG. 1.

Referring to FIG. 3, the user terminal device 100 may be configured to include the transceiver 110, the touch screen 120, the processor 130, the storage 140, a GPS chip 150, a video processor 160, an audio processor 170, a button 125, a microphone 180, the imager 185, and a speaker 190.

The transceiver 110 is configured to perform communication with various types of external devices according to various types of communication schemes. The transceiver 110 includes a Wi-Fi chip 111, a Bluetooth chip 112, a wireless communication chip 113, and a near field communication (NFC) chip 114. The processor 130 uses the transceiver 110 to perform communication with various kinds of external devices.

The Wi-Fi chip 111 and the Bluetooth chip 112 each perform communications by a Wi-Fi scheme and a Bluetooth scheme, respectively. In the case of using the Wi-Fi chip 111 or the Bluetooth chip 112, various connection information such as a Service Set Identifier (SSID) and a session key is first transmitted and received, a communication connection is made using the various connection information, and then various kinds of information may be transmitted and received. The wireless communication chip 113 means a chip which performs communication depending various communication standards such as IEEE, Zigbee, 3rd generation (3G), 3rd generation partnership project (3GPP), LTE, and the like. The NFC chip 114 means a chip which is operated by the NFC scheme using a band of 13.56 MHz among various radio frequency ID (RF-ID) frequency bands such as 135 kHz, 13.56 MHz, 433 MHz, 860 to 960 MHz, and 2.45 GHz.

The touch screen 120 may receive the fax address information as described above and may display the UI window for displaying the determination result. The touch screen 120 may be implemented as various forms of displays such as a liquid crystal display (LCD), an organic light emitting diode (OLED) display, and a plasma display panel (PDP). A driving circuit which may be implemented in forms of a Thin Film Transistor (TFT), a low temperature poly silicon (LTPS) TFT, an organic TFT (OTFT), etc., a backlight, or the like may be included within the touch screen 120. Further, the touch screen 120 may also be implemented as flexible display.

Meanwhile, the touch screen 120 may include a touch sensor for sensing a touch gesture of a user. The touch sensor may be implemented by various types of sensors such as a capacitive type sensor, a resistive type sensor, a piezoelectric type sensor, and the like. The capacitive type uses a scheme of calculating touch coordinates by sensing micro electricity excited to a user's body when a portion of the user's body is touched on a surface of the touch screen, using the dielectric substance coated on the surface of the touch screen. The resistive type includes two electrode plates embedded in the touch screen and uses a scheme of calculating touch coordinates by sensing a flow of current due to a contact between the upper and lower plates at a touched point when the user touches the screen. In addition, when the user terminal device 100 supports a pen input function, the touch screen 120 may sense a user gesture using an input means like a pen in addition to a user's finger. When the input means is a stylus pen having a coil included therein, the user terminal device 100 may also include a magnetic field sensing sensor which may sense a magnetic field changed by the coil inside the stylus pen. Therefore, the user terminal device 100 may sense a proximity gesture, that is, hovering as well as the touch gesture.

Meanwhile, the embodiment of the present disclosure describes that one touch screen 120 performs both of the display function and the touch gesture sensing function, but in the implementation, the display function and the gesture sensing function may be performed in different configurations. That is, the touch screen 120 may also be implemented by combining a display device that may display only an image and a touch panel that may sense only a touch.

The storage 140 may store various programs and data required to operate the user terminal device 100. In detail, the storage 140 may store a program, data, or the like for configuring various UIs configuring the user interface window. Further, the storage 140 stores various contents. Here, the contents may be a document file that may be printed or transmitted by fax, an image file, or the like. Further, the storage 140 may store a plurality of telephone numbers. In this case, the storage 140 may also store telephone attribute values (for example, values dividing whether a plurality of telephone numbers are a cellular phone number, a fax number, or a general telephone number) for a plurality of telephone numbers, respectively. Further, the storage 140 stores a plurality of applications. Here, at least one application may be the SCP application for the operations as described in the present disclosure.

The processor 130 uses the program and the data stored in the storage 140 to display the user interface window on the touch screen 120. Further, when a specific region of the user interface window is touched by a user, the processor 130 performs a control operation corresponding to the touch. The processor 130 includes a RAM 131, a ROM 132, a central processing unit (CPU) 133, a graphic processing unit (GPU) 134, and a bus 135. The RAM 131, the ROM 132, the CPU 133, the GPU 134, etc., may be connected to each other through the bus 135.

The CPU 133 accesses the storage 140 to perform booting using an O/S stored in the storage 140. Further, the CPU executes various operations using various programs, contents, data, and the like which are stored in the storage 140. The ROM 132 is stored with a set of commands for system booting. When a turn on command is input and thus power is input, the CPU 133 copies an O/S stored in the storage 140 to the RAM 131 according to the command stored in the ROM 132 and executes the O/S to boot the system. If the booting is completed, the CPU 133 copies the various programs stored in the storage 140 to the RAM 131 and executes the programs copied to the RAM 131 to execute various operations.

When the booting of the user terminal device 100 is completed, the GPU 134 displays the UI on the touch screen. In detail, the GPU 134 may use an operator (not illustrated) and a renderer (not illustrated) to generate a screen including various objects such as an icon, an image, and a text. The operator operates attribute values, such as coordinate values at which each object will be displayed and forms, sizes, and colors of each object, according to a layout of the screen. The renderer generates a screen of various layouts including an object based on the attribute values that are operated by the operator. The screen (or user interface window) generated from the renderer is provided to the touch screen 120 and the touch screen 120 may display the provided screen.

The GPS chip 150 is a component for receiving a global positioning system (GPS) signal from a GPS satellite to calculate a current position of the user terminal device 100. The processor 130 may use the GPS chip 150 to calculate a user position when a navigation program is used or the current position of the user is required.

The video processor 160 is a component for processing video data which are included in contents received through the transceiver 110 or contents stored in the storage 140. The video processor 160 may perform various types of image processing, such as decoding, scaling, noise filtering, frame rate conversion, and resolution conversion, on the video data.

The audio processor 170 is a component for processing audio data which are included in contents received through the transceiver 110 or contents stored in the storage 140. The audio processor 170 may perform various types of audio processing, such as decoding, amplification, and noise filtering.

When a playing application for multimedia contents is executed, the processor 130 may drive the video processor 160 and the audio processor 170 to play the corresponding contents. In this case, the touch screen 120 may display an image frame generated from the video processor 160 on at least one of a main display region and a sub display region.

Further, the speaker 190 outputs the audio data generated from the audio processor 170.

The button 125 may be various types of buttons such as a mechanical button, a touch pad, and a wheel which are formed in any region such as a front portion, a side portion, a rear portion, etc., of an appearance of a main body of the user terminal device 100. The button 125 is disposed at a side portion of an appearance of a main body and may include a '+' button receiving a command to increase a sound level and a '−' button receiving a command to decrease the sound level.

The microphone 180 is a component for receiving a user voice or other sounds and converting the received user voice or other sounds into the audio data. The processor 130 may use the user voice input through the microphone 180 during a call process or convert the user voice into the audio data and store the converted audio data in the storage 140. Meanwhile, the microphone 180 may be implemented as a stereo microphone that receives a sound input from several positions.

The imager 185 is a component for imaging a still image or a moving picture depending on the control of the user. The imager 185 may be implemented in plural, like a front camera and a rear camera. As described above, the imager 185 may be used as a means for acquiring a user image in the embodiment for tracking the user eyes.

When the imager 185 and the microphone 180 are provided, the processor 130 may also perform the control operation depending on the user voice input through the microphone 180 or a user motion recognized by the imager 185. That is, the user terminal device 100 may be operated in a motion control mode or a voice control mode. When the user terminal device 100 is operated in the motion control mode, the processor 130 activates the imager 185 to image the user and tracks the motion change of the user to perform the control operation corresponding thereto. When the user terminal device 100 is operated in the voice control mode, the processor 130 may also be operated in a voice recognition mode that analyzes the user voice input through the microphone 180 and performs the control operation depending on the analyzed user voice.

In the user terminal device 100 supporting the motion control mode or the voice control mode, a voice recognition technology or a motion recognition technology may be used in various embodiments as described above. For example, if the user takes a motion like selecting the object displayed on the home screen or pronounces a voice command corresponding to the object, it is determined that the corresponding object is selected and the control operation matched with the object may be performed.

In addition, although not illustrated in FIG. 3, according to the embodiment of the present disclosure, the user terminal device 100 may further include a universal serial bus (USB) port to which an USB connector may be connected, external input ports connected to various external terminals such as a headset, a mouse, and an LAN, a digital multimedia broadcasting (DMB) chip receiving and processing a DMB signal, various sensors, etc.

Meanwhile, as described above, the storage 140 may store various programs executable by the processor 130 to implement corresponding functions.

Figure 4:
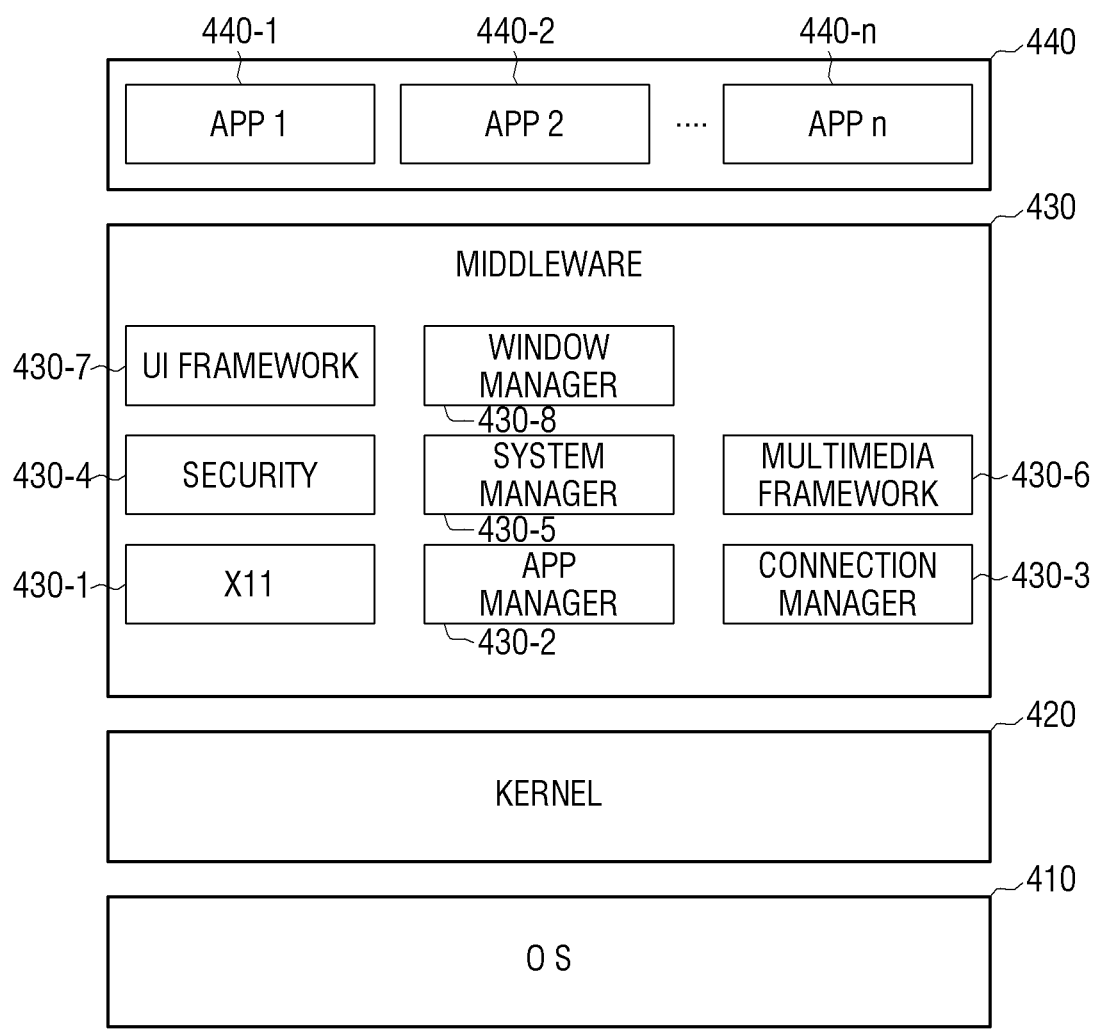
FIG. 4 is a diagram illustrating an example of a software configuration of a user terminal device according to an embodiment of the present disclosure.

FIG. 4 is a diagram illustrating an example of a software configuration of a user terminal device 100.

Referring to FIG. 4, is a diagram for describing a software structure stored in the user terminal device 100. As illustrated in FIG. 4, the storage 140 may store software such as an operating system (OS) 410, a kernel 420, middleware 430, and an application module 440.

The operating system (OS) 410 serves to control and manage the general operations of hardware. That is, the OS 410 is a layer serving to perform basic functions such as hardware management, memory, and security. The kernel 420 serves as a path through which various signals in addition to a touch signal, etc., sensed by the touch screen 120 is transferred to the middleware 430. The middleware 430 includes various software modules controlling the operation of the user terminal device 100. In detail, the middleware 430 includes an X11 module 430-1, an APP manager 430-2, a connection manager 430-3, a security module 430-4, a system manager 430-5, a multimedia framework 430-6, a UI framework 430-7, a window manager 430-8, or the like.

The X11 module 430-1 is a module receiving various event signals from various kinds of hardware included in the user terminal device 100. Here, the event may be variously set like an event that the user gesture is sensed, an event that the user terminal device 100 moves in a specific direction, an event that a system alarm is generated, and an event that a specific program is executed or ends, or the like.

The APP manager 430-2 is a module managing an execution state of various applications 440-1-4401-n in the application module 440, and installed in the storage 140. The APP manager 430-2 calls an application corresponding to the corresponding event from the X11 module 430-1 and executes the application when an application execution event is sensed. For example, when the icon of the SCP application is selected, the APP manager 430-2 may call and execute the SCP application.

The connection manager 430-3 is a module supporting a wired or wireless network connection. The connection manager 430-3 may include various detailed modules such as a DeviceNet (DNET) module and a Universal Plug and Play (UPnP) module. In detail, when the SCP application is executed, the connection manager 430-3 may form a session with the cloud server 300.

The security module 430-4 is a module supporting certification of hardware, request permission, secure storage, and the like.

The system manager 430-5 monitors a state of each component within the user terminal device 100 and provides the monitored results to other modules. For example, when a residual quantity of a battery is short or an error occurs or when a communication connection state is broken, etc., the system manager 430-5 may provide the monitored result to the UI framework 430-7 to output a notification message or a notification sound.

The multimedia framework 430-6 is a module playing multimedia contents which are stored in the user terminal device 100 or provided from external sources. The multimedia framework 430-6 may include a player module, a camcorder module, a sound processing module, and the like. Therefore, the multimedia framework 230-6 may perform an operation of playing various multimedia contents to generate and play a screen and a sound.

The UI framework 430-7 is a module for providing various UIs that will be displayed on the touch screen 120. The UI framework 430-7 may include an image compositor module configuring various objects, a coordinate compositor calculating coordinates at which an object is displayed, a rendering module rendering the configured object to the calculated coordinates, a 2D/3D UI toolkit providing a tool for configuring a 2D or 3D type of UI, etc.

The window manager 430-8 may sense a touch event using a user's body or a pen or other input events. When the event is sensed, the window manager 430-8 transfers the event signal to the UI framework 430-7 to perform the operation corresponding to the event.

In addition, when the user touches and drags the screen, various program modules such as a handwriting module for drawing a line along a drag trajectory, and an angle calculation module for calculating a pitch angle, a roll angle, a yaw angle, etc., based on sensor values sensed by a gyro sensor of the user terminal device 100 may also be stored.

The application module 440 includes applications 440-1-440-n supporting various functions. For example, the application module 440 may include application modules for providing various services such as an SCP application module, a navigation application module, a game module, an e-book module, a calendar module, and an alarm management module. The applications may be installed as a default or may be arbitrarily installed in use. When an icon object of the user interface window is selected, the CPU 133 may execute an application corresponding to the selected icon object using the application module 440.

The software structure illustrated in FIG. 4 is only an example, and therefore the present disclosure is not necessarily limited thereto. Therefore, if necessary, some of the software structure may be omitted, changed, or added. For example, the storage 140 may additionally store various programs such as a sensing module analyzing signals sensed by various sensors, a messaging module such as a messenger program, a short message service (SMS) & multimedia message service (MMS) program, and an e-mail program, a call info aggregator program module, a voice over internet Protocol (VoIP) module, and a web browser module.

Meanwhile, as described above, the user terminal device 100 may be implemented as various types of apparatuses such as a cellular phone, a tablet PC, a laptop PC, a PDA, an MP3 player, a digital photo frame, TV, a PC, and a kiosk. Therefore, the configuration illustrated in FIGS. 2 and 3 may be variously changed according to a kind of the user terminal device 100.

As described above, the user terminal device 100 may be implemented as various forms and configurations.

Figure 5:
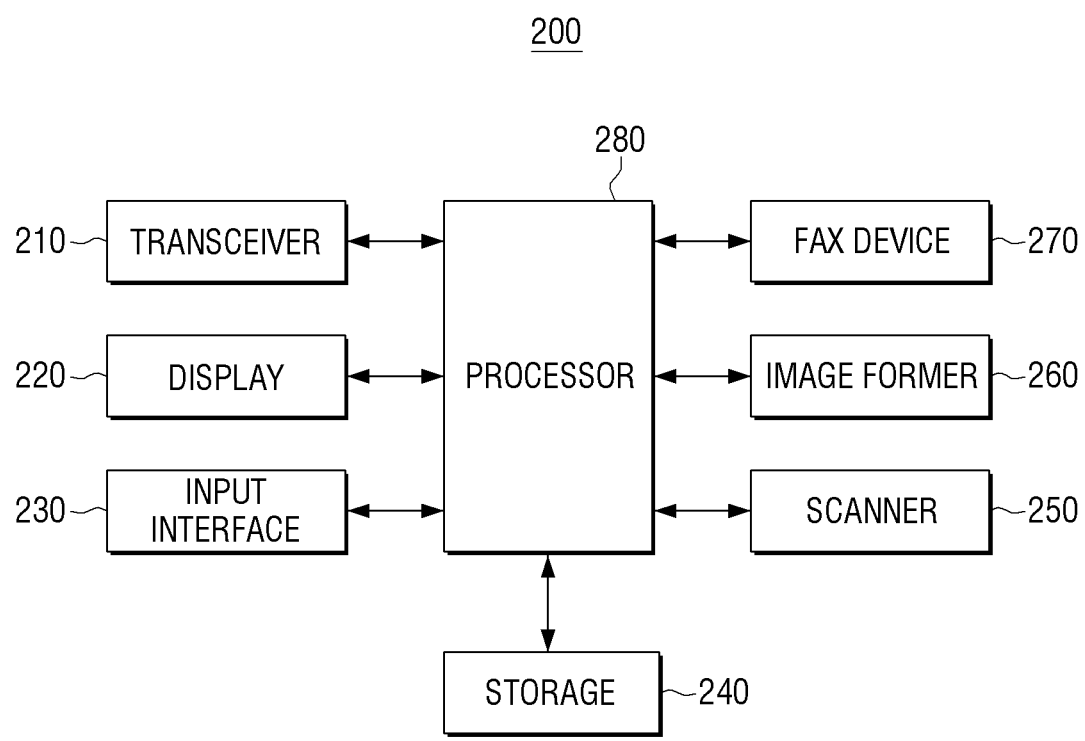
FIG. 5 is a block diagram illustrating a configuration of an image forming apparatus of FIG. 1 according to an embodiment of the present disclosure.

FIG. 5 is a block diagram illustrating a configuration of the user terminal device of FIG. 1.

Referring to FIG. 5, the image forming apparatus 200 may be configured to include a transceiver 210, a display 220, an input interface 230, a storage 240, a scanner 250, an image former 260, a fax device 270, and at least one processor 280.

The transceiver 210 may connect the image forming apparatus 200 to external devices and may do so through a LAN and the internet network and to be connected through USB port and a wireless module. Here, the wireless module may be Wi-Fi, Wi-Fi Direct, NFC, Bluetooth, etc.

The transceiver 210 receives printing data from an external device. In this case, the external device may be the cloud server 300 as well as the user terminal device 100. That is, when performing the fax receiving function, the image forming apparatus according to the embodiment of the present disclosure may receive printing data like the scheme of receiving printing data. In this case, the transceiver 210 may receive authentication information (for example, NFC tag, card authentication, password authentication) corresponding to the received printing data.

Further, the transceiver 210 may receive user authentication information through NFC communication. Therefore, the authentication information received through the NFC tag may be used for comparison with the authentication information received along with the printing data, that is, may be used for the user authentication.

The transceiver 210 transmits fax address information to the cloud server 300. In detail, the transceiver 210 may transmit the fax address information input or selected on the input interface 230 to be described below to the cloud server 300 through the internet network. Here, the fax address information is information that may specify the opponent image forming apparatus and may be the telephone number (that is, fax telephone number) for the PSTN network connected to the corresponding image forming apparatus but may also be a virtual telephone number allocated to the corresponding image forming apparatus, a MAC address, an IP address, or the like.

Further, the transceiver 210 receives the determination result on whether the opponent image forming apparatus is a pre-registered apparatus from the cloud server 300. Here, the determination result may be information indicating whether the opponent image forming apparatus is an apparatus registered in the SCP server or is an apparatus not registered in the SCP server, that is, information indicating whether or not the opponent image forming apparatus is an apparatus capable of performing a job based on a telephone number. Alternatively, the determination result may be the information (that is, PSTN network and internet network) on the communication network determined by the cloud server 300.

Further, the transceiver 210 transmits fax data to the cloud server 300. Here, the transmitted fax data may be the printing data pre-stored in the storage 240 (to be described below), or may be a scan image generated from the scanner 250 (to be described below). Here, the printing data may be data of a printer language such as a postscript (PS) and a printer control language (PCL) and when the image forming apparatus 200 supports direct printing, the printing data may be files such as portable document format (PDF), XPS, Bitmap (BMP), and Joint Photographic Experts Group (JPEG).

The display 220 may display various kinds of information that is provided from the image forming apparatus 200. The display 220 may be a display like a monitor. In the implementation, the touch screen may also be implemented as the touch screen that may perform one of the functions of the input interface 230 to be described below. Further, the display 220 displays a menu UI for selecting the functions supported by the image forming apparatus.

Further, the display 220 displays the pre-stored telephone number. In this case, the display 220 may display attributes (whether the telephone number is the fax telephone number) of the telephone number along with the pre-stored telephone number. Further, the display 220 may display the UI for selecting content to be transmitted.

Further, the display 220 displays the received determination result. In detail, the display 220 may display the determination result on whether the opponent image forming apparatus corresponding to the fax address received through the transceiver 210 is an apparatus pre-registered in the cloud server 300. In detail, if the opponent image forming apparatus corresponding to the fax address is not a pre-registered apparatus, the display 220 needs to transmit the content by the PSTN scheme since the opponent image forming apparatus is not a pre-registered apparatus, and therefore the fax transmission costs may be incurred. In this case, the display 220 may additionally display a window for confirming whether the operation is in progress and an option to continue or cancel the operation.

If the opponent image forming apparatus corresponding to the fax address is a pre-registered apparatus, the display 220 may display that the fax may be transmitted through the internet network. Meanwhile, the opponent image forming apparatus is connected to the PSTN network and if the opponent image forming apparatus may be connected to through both the PSTN network and the internet network, the display 220 may select in which network the fax data is to be transmitted. Preferably, it is advantageous in cost and quality to transmit the fax data through the internet network, and therefore, if the opponent image forming apparatus is a pre-registered apparatus, the operation may continue through the internet network without additional confirmation.

Further, the display 230 may receive the printing data and then display that the user authentication is required. Further, the display 230 may display the user interface window for performing authentication corresponding to the received user authentication information. For example, if the authentication information is a password, the display 230 may display a screen for receiving a password and if the authentication information is NFC information, may display guide information for the NFC tag.

Further, the input interface 230 includes a plurality of function keys by which the user may set or select various kinds of functions supported by the image forming apparatus 200. The input interface 230 may be implemented as apparatuses such as a button, a touch pad, a mouse, and a keyboard or may also be implemented as the touch screen that may perform the function of the display 220 described above.

The input interface 230 receives the fax transmission command from the menu displayed on the display 220. Further, the input interface 230 may select one of the displayed telephone numbers. In this case, when the selected telephone number is a fax number, the operation according to the embodiment of the present disclosure is performed. Further, the input interface 230 may select content through the displayed UI. Further, the input interface 230 may receive information such as a password required for authentication from a user.

The storage 240 stores the printing data received through the transceiver 210. Further, the storage 240 may store a program, data, or the like for configuring various UIs configuring the user interface window. Further, the storage 240 includes various contents. Here, the contents may be a document file (or printing data) that may be printed or transmitted by fax, an image file (scan image generated by the scanner), or the like. Further, the storage 240 may store a plurality of telephone numbers. In this case, the storage 240 may also store telephone attribute values (for example, values dividing whether a plurality of telephone numbers are a cellular phone number, a fax number, or a general telephone number) for a plurality of telephone numbers, respectively.

Meanwhile, the storage 240 may be implemented as a storage medium in the image forming apparatus 200 and an external storage medium, for example, a removable disk including a USB memory, a web server though a network, and the like.

The scanner 250 scans a manuscript to generate a scan image. In detail, the scanner 250 includes a light emitter (not illustrated) that emits light to a manuscript, a lens (not illustrated) that forms light reflected from the manuscript on an image sensor, the image sensor, or the like and reads image information of the manuscript from the light formed on the image sensor.

The scanner 250 may be an apparatus that scans the manuscript put on a flatbed, an apparatus that scans one surface or both surfaces of the manuscript fed by an automatic document feeder (ADF), and a combination of the two apparatuses. Meanwhile, the scanner 250 may generate a plurality of scan images continuously scanned in the automatic document feeder as one file.

The image former 260 prints the printing data on printing paper. In detail, the image former 260 may print the printing data received through the transceiver 210 on the printing paper by any one of an inkjet scheme, a dot jet scheme, and a laser printer scheme. In this case, the printing data may be the data received through the transceiver 210, the scan data generated by the scanner 250, and the fax data received by the fax device 270.

The fax device 270 includes a fax modem connected to the PSTN network. The corresponding modem has a fax line having a specific fax telephone number. The embodiment of the present disclosure describes that only one fax modem is included in one fax device 270, but in the implementation, the fax device 270 may also include a plurality of fax modems, that is, a plurality of fax lines.

The fax device 270 may convert data into fax data. In detail, the fax device 270 may convert the pre-stored printing data or scan data into a fax format (MH/MR/MMR/JBIG/JPEG) meeting a fax transmit standard (T.30 protocol) and transmit the converted data to the opponent image forming apparatus through the PSTN network. In this case, the fax device 270 may merge the pre-stored transmitting side information (TTI) with the existing printing data or scan data to generate the fax data. In describing FIG. 5, the form that the image forming apparatus 200 includes the fax device is illustrated and described, but in the implementation, the fax device may be omitted.

Further, the fax device 270 may receive the fax data through the PSTN network and transfer the received fax data to the image former 260 to print the fax data or store the fax data in the storage 240.

The processor 280 controls each component of the image forming apparatus 200. In detail, if the user selects the SCP application, the processor 280 may drive the SCP application. If the SCP application is driven, the processor 130 may control the display 220 to display the UI provided from the SCP application.

If the fax address information is received through the UI provided, the processor 280 controls the transceiver 210 to transmit the received fax address information to the cloud server 300. In the implementation, the pre-selected content may also be transmitted along with the fax address information.

If the determination result of the cloud server 300 on whether the opponent image forming apparatus corresponding to the fax address information is pre-registered is received, the processor 280 may control the touch screen 120 to display the received determination result.

Further, the processor 280 may control the transceiver 210 to transmit the selected content to the cloud server 300.

Meanwhile, if the determined communication network is the PSTN network, the processor 280 may convert content into the fax data of the fax format and transmit the converted data to the cloud server 300. Meanwhile, in the implementation, if the cloud server 300 may perform the conversion operation, the processor 280 may transmit a file itself to the cloud server 300 without separately converting content.

Meanwhile, if the determined communication network is the PSTN network, the processor 280 does not transmit the content to the cloud server 300 but may transmit the content to the opponent image forming apparatus 10 through the fax device 270. If the fax command of the user is the fax command for the manuscript, the processor 280 may control the scanner 250 to generate the scan image for the manuscript and control the fax device 270 to change the generated scan image to the fax format and transmit the image through the PSTN network.

When receiving the printing data through the transceiver 210, the processor 270 may control the image former 260 to print the received printing data. In this case, when receiving the user information along with the printing data, the processor 270 stores the received printing data in the storage 240. Next, if the authentication information is input from the authenticated user, the processor 270 may control the image former 260 to print the pre-stored printing data.

As described above, the image forming apparatus 200 according to an embodiment of the present disclosure may transmit a fax even when not including a fax module, thereby improving the user convenience. Further, the image forming apparatus 200 according to an embodiment of the present disclosure may transmit the fax data through the internet network to save the communication fee and may transmit the fax data without using a fax format to transmit the fax data with higher image quality than what is supported by the fax format.

Figure 6:
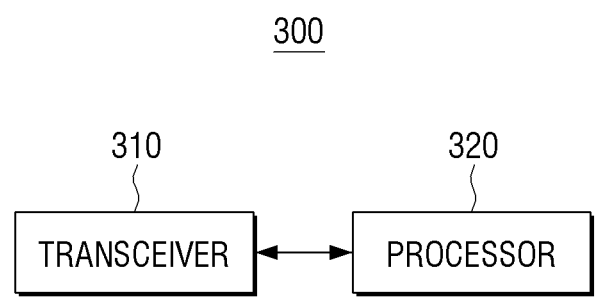
FIG. 6 is a block diagram illustrating a simple configuration of a cloud server of FIG. 1 according to an embodiment of the present disclosure.

FIG. 6 is a block diagram illustrating a simple configuration of a cloud server of FIG. 1.

Referring to FIG. 6, the cloud server 300 may be configured to include a transceiver 310 and at least one processor 320. The cloud server 300 may be implemented as a general server apparatus as well as a terminal device like PC, or the like.

The transceiver 310 is formed to connect the cloud server 300 to external devices and may be implemented to be connected through a LAN and the internet network and to be connected through a USB port and a wireless module. Here, the wireless module may be WiFi, WiFi Direct, NFC, Bluetooth, etc.

Further, the transceiver 310 may receive the user information from the user terminal device 100. In detail, the transceiver 310 may receive account information for accessing a user account from the user terminal device 100.

Further, the transceiver 310 receives information on a new image forming apparatus. In detail, the transceiver 310 may receive the information on the new image forming apparatus to be added to the user account as a telephone number. In this case, the transceiver 310 may also receive function information along with the telephone number.

Further, the transceiver 310 retrieves the connectable image forming apparatus. In detail, the transceiver 310 may retrieve a currently connectable image forming apparatus among the image forming apparatuses connected to the received user account.

Further, the transceiver 310 receives apparatus information on the retrieved image forming apparatus. In detail, the transceiver 310 may receive the apparatus information on the image forming apparatus corresponding to the user account.

Here, the apparatus information may include an apparatus name, address information (information required for connection with the image forming apparatus such as IP address, MAC information, etc.), function information (information on functions which are supported by the image forming apparatus such as whether to perform the color printing, whether to perform the scanning, etc.), state information (whether to perform the current job, whether an error occurs, a job progress state, etc.), and group information (information required to generate a job group to be described below) of the image forming apparatus.

Further, the transceiver 310 may receive a job performance command from the user terminal device 100. Here, the job performance command may be the printing command to the telephone number or the fax transmission command to the fax telephone number according to the embodiment of the present disclosure.

Further, the transceiver 310 receives the printing data from the user terminal device 100. Here, the printing data may be data of a printer language such as a postscript (PS) and a printer control language (PCL) and when the image forming apparatus 200 supports direct printing, the printing data may be files such as PDF, XPS, BMP, and JPG.

The transceiver 310 receives the fax address information from the user terminal device 100 or the image forming apparatus 200. In detail, the transceiver 310 may receive the fax address information from the user terminal device 100 or the image forming apparatus 200 through the internet network. Here, the fax address information is information that may specify the opponent image forming apparatus and may be the telephone number (that is, fax telephone number) for the PSTN network connected to the corresponding image forming apparatus but may also be a virtual telephone number allocated to the corresponding image forming apparatus, a MAC address, an IP address, or the like.

Further, the transceiver 310 transmits the determination result on whether the opponent image forming apparatus is a pre-registered apparatus to the apparatus transmitting the fax address information. Here, the determination result may be information indicating whether the opponent image forming apparatus is an apparatus registered in the SCP server or is an apparatus not registered in the SCP server, that is, information indicating whether the opponent image forming apparatus is an apparatus capable of performing a job based on a telephone number. Alternatively, the determination result may be the information (that is, PSTN network and internet network) on the communication network determined by the cloud server 300.

Further, the transceiver 310 receives the fax data from the user terminal device 100 or the image forming apparatus 200. Here, the transmitted fax data may be the document file itself, the printing file, the scan file, or the like.

Further, the transceiver 310 transmits the fax data received from the user terminal device 100 or the image forming apparatus 200 to the opponent image forming apparatus. In detail, if the communication network determined in a process to be described below is the PSTN network, the transceiver 310 may transmit the received fax data through the PSTN network as the fax format. Further, if the determined communication network is the internet network, the transceiver 310 may transmit the received data through the internet network as the printing format. In this case, the transceiver 310 may transmit the user authentication information corresponding to the fax transmission request to the opponent image forming apparatus, along with the fax data.

The processor 320 controls each component of the cloud server 300. In detail, when receiving the information on the image forming apparatus to be connected and the user account information from the user terminal device, the processor 320 may register the corresponding image forming apparatus in the cloud server 300. Further, the processor 320 may store the information on the corresponding image forming apparatus in a mapping table. Here, the mapping table may be a lookup table for fax addresses and internet addresses of the plurality of image forming apparatuses, respectively, that may be connected to the internet network. Here, the internet address may be an IP address of the image forming apparatus, an MAC address of the image forming apparatus, a virtual telephone number allocated to the image forming apparatus, or the like.

Further, when receiving the fax transmission request, the processor 320 may determine a communication network to be used for communication with the opponent image forming apparatus among a plurality of communication networks depending on whether the opponent image forming apparatus corresponding to the fax transmission request is a pre-registered apparatus. In detail, when receiving the fax transmission request, the processor 320 may determine whether the opponent image forming apparatus is a pre-registered apparatus depending on whether the fax address of the opponent image forming apparatus corresponding to the fax transmission request is registered (i.e., stored) in the mapping table. Further, when the fax address of the opponent image forming apparatus is registered in the mapping table, the processor 320 may determine the internet network among the plurality of communication networks as the communication network to be used for communication with the opponent image forming apparatus and when the fax address is not registered in the mapping table, may determine the PSTN network among the plurality of communication networks as the communication network to be used for communication with the opponent image forming apparatus.

In this case, the processor 320 may control the transceiver 310 to notify the user terminal device or the image forming apparatus transmitting the fax transmission request of the determination result on whether the opponent image forming apparatus is the pre-determined apparatus.

Further, the processor 320 determines the communication network to be used for communication with the opponent image forming apparatus, among the PSTN network and the internet network depending on whether the opponent image forming apparatus is a pre-registered apparatus. In detail, the processor 320 may determine that the internet network is used, if the opponent image forming apparatus is a pre-registered apparatus and determine that the PSTN network is used, if the opponent image forming apparatus is not a pre-registered apparatus. Meanwhile, when the opponent image forming apparatus may use both of the PSTN network and the internet network, the processor 320 may select which scheme the user terminal device 100 or the image forming apparatus 200 transmitting the fax transmission request uses and may also reflect the result to determine the communication network to be used for communication with the opponent image forming apparatus.

Further, the processor 320 controls the transceiver 310 to transmit the fax data corresponding to the fax transmission request to the opponent image forming apparatus using the determined communication network. In detail, the processor 320 may control the transceiver 310 to transmit the fax data of the fax format through the PSTN network if the determined communication network is the PSTN network and transmit the fax data of the printing format through the internet network if the determined communication network is the internet network.

Further, the processor 320 may control the transceiver 310 to transmit the user authentication information corresponding to the fax transmission request along with the transmission of the fax data if the determined communication network is the internet network.

Further, the processor 320 may store a history of the fax transmission request described above as history information.

As described above, the cloud server 300 according to the embodiment of the present disclosure may also perform a fax transmission requested from a user terminal device or an image forming apparatus that does not include a fax module, thereby improving user convenience. Further, the cloud server 300 according to the embodiment of the present disclosure transmits the fax data through the internet network, thereby saving a communication fee. Further, the cloud server 300 may transmit the fax data without using a fax format, and therefore may transmit the fax data with higher image quality than what is supported by the fax format.

Only the schematic configuration of the cloud server 300 is illustrated and described above, but the cloud server 300 may further include components other than the foregoing components. A more detailed configuration of the cloud server 300 will be described below with reference to FIG. 7.

Figure 7:
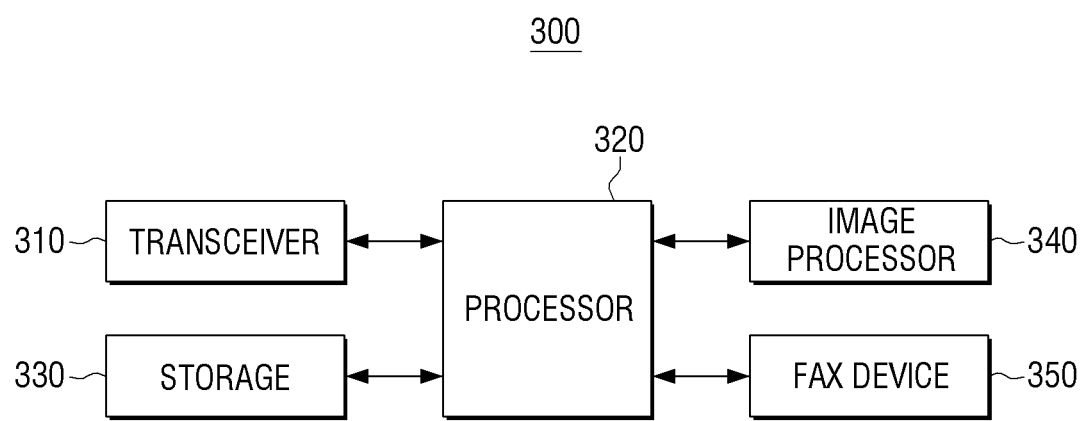
FIG. 7 is a block diagram illustrating a detailed configuration of a cloud server of FIG. 1 according to an embodiment of the present disclosure.

FIG. 7 is a block diagram illustrating a detailed configuration of the cloud server of FIG. 1.

Referring to FIG. 7, the cloud server 300 may be configured to include a transceiver 310, at least one processor 320, a storage 330, an image processor 340, and a fax device 350.

The operation of the transceiver 310 and the processor 320 is the same as each component described with reference to FIG. 6, and therefore the overlapping description thereof will be omitted.

The storage 330 stores the information on the user account. Here, the information on the user account is information including the telephone number corresponding to the user account, the information for the user authentication (for example, ID and password), the information on the image forming apparatus corresponding to the user account, or the like.

Further, the storage 330 stores the information on the account of the image forming apparatus. Here, the information on the account of the image forming apparatus is information including the telephone number, the physical address, the account address of the image forming apparatus 200, and the user account that may use the corresponding image forming apparatus. The information on the account of the image forming apparatus may be stored in the mapping table form described above. The information on the account of the image forming apparatus may be stored within the cloud server 300 as well as may be stored in the separate server (or terminal device). That is, when receiving the fax transmission request from the terminal device, the cloud server 300 may use the information on the account of the image forming apparatus stored in the separate server (or terminal device) to understand whether the image forming apparatus is a pre-registered apparatus.

Further, the storage 330 may store the printing data. Further, the storage 330 may store the fax data generated from the image processor 340 to be described below. Further, the storage 330 may store the history of the fax transmission request. In detail, the storage 330 may store the history of the fax transmission request for each user account.

Meanwhile, the storage 330 may be implemented as a storage medium in the cloud server 300 and an external storage medium, for example, a removable disk including a USB memory, a file server though a network, and the like.

The image processor 340 may convert received data into fax data. In detail, the image processor 340 may convert the pre-stored printing data or scan data into the fax format (MH/MR/MMR/JBIG/JPEG) meeting a fax transmit standard (T.30 protocol). In this case, the image processor 340 merges the pre-stored TTI (transmitting side information) with the received data to generate the fax data. In the implementation, the image processor 340 may be implemented as a component of the fax device 350.

The fax device 350 includes a fax modem connected to the PSTN network. The corresponding modem has a fax line having a specific fax telephone number. The embodiment of the present disclosure describes that only one fax modem is included in one fax device 350, but in the implementation, the fax device 350 may also include a plurality of fax modems, that is, a plurality of fax lines.

As described above, the cloud server 300 according to the embodiment of the present disclosure may also perform the fax transmission requested by a user terminal device or an image forming apparatus that does not include a fax module, thereby improving user convenience. Further, the cloud server 300 according to the embodiment of the present disclosure transmits the fax data through the internet network, thereby saving a communication fee. Further, the cloud server 300 may transmit the fax data without using a fax format, and therefore may transmit the fax data with higher image quality than what is supported by the fax format.

In FIG. 7, the fax device 350 and the transceiver 310 are illustrated as separate components, but in the implementation, the fax device 350 may be a component included in the transceiver 310.

Figure 8:
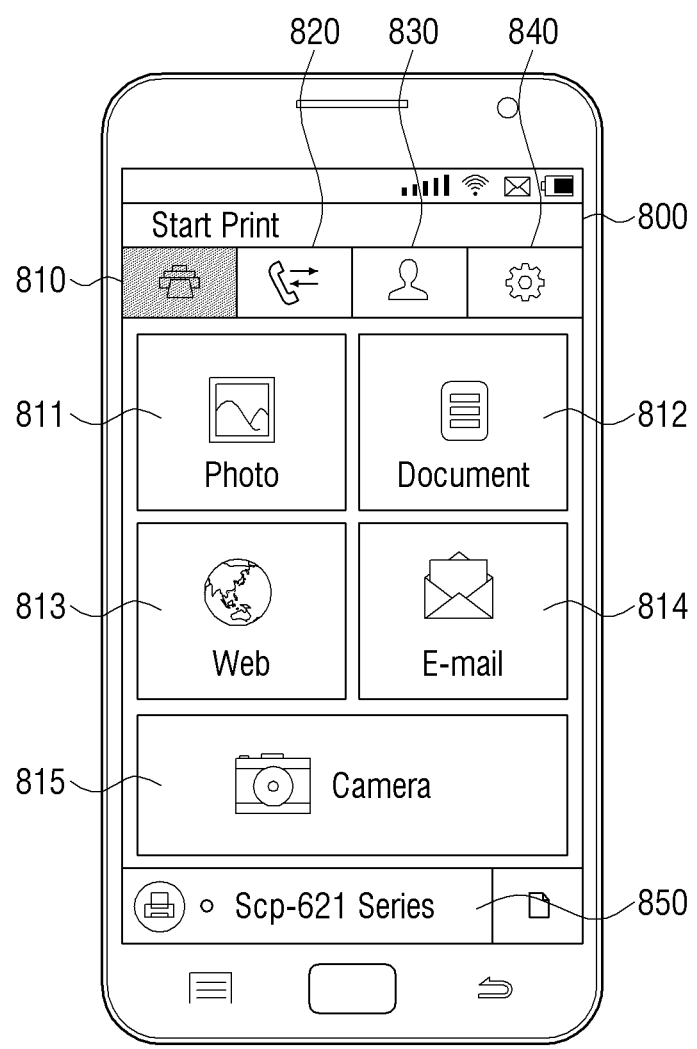
FIGS. 8 and 9 are diagrams illustrating various examples of a user interface window that may be displayed on a touch screen of FIG. 2 according to various embodiments of the present disclosure.
Figure 9:
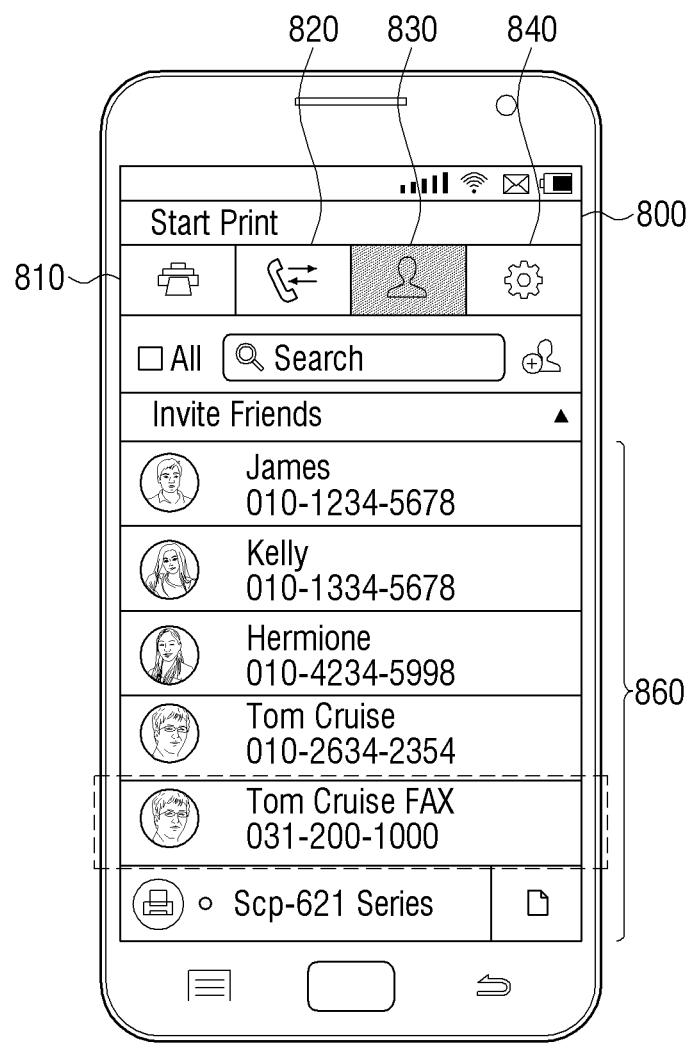

FIGS. 8 and 9 are diagrams illustrating various examples of a user interface window that may be displayed on a touch screen of FIG. 2.

Referring to FIG. 8, a user interface window 800 includes a plurality of menus 810, 820, 830, and 840, submenus 811, 812, 813, 814, and 815 under a first menu 810, and an apparatus information region 850.

The plurality of menus 810, 820, 830, and 840 are menus for each function of the SCP application, in which the first menu 810 is a menu for selecting content and the third menu 830 is a menu for selecting the opponent image forming apparatus. When a user selects the third menu, the user interface window may be displayed as illustrated in FIG. 9.

The first menu 810 is pre-selected currently, and therefore sources for selecting content may be displayed by the submenus 811, 812, 813, 814, and 815.

The first submenu 811 is a submenu for selecting a pre-stored picture image as a source. If the first submenu 811 is selected, the picture image pre-stored in the user terminal device 100 may be displayed in a list form.

The second submenu 812 is a submenu for selecting a pre-stored document file as a source. If the second submenu 812 is selected, the document files pre-stored in the user terminal device 100 may be displayed in a list form.

The third submenu 813 is a submenu for selecting an internet address as a source. If the third submenu 813 is selected, an application for web surfing is driven and the UI of the corresponding application may be displayed.

The fourth submenu 814 is a submenu for selecting a received e-mail as a source. If the fourth submenu is selected, an UI screen displaying the pre-received e-mail may be displayed.

Further, the fifth submenu 815 is a submenu for selecting an image newly photographed by an imager as a source. If the fifth submenu 815 is selected, it may be converted into the UI screen for an imaging function.

The apparatus information region 850 is a region for displaying the information on the pre-registered image forming apparatus mapped to a telephone number of a user. Therefore, if the user selects content through the foregoing submenu to input a printing command, the corresponding content is transmitted to the image forming apparatus corresponding to the apparatus information region 850, and thus the corresponding image forming apparatus may perform a printing job.

Referring to FIG. 9, the user interface window 800 is changed to an address list region 860 in place of the lower submenus 811, 812, 813, 814, and 815 of FIG. 8.

The address list region 860 is a region for displaying address information pre-stored in the user terminal device 100. As illustrated, the address information may be displayed while being aligned in a name order of users and information on attributes (for example, fax number) of a telephone number may be displayed together.

The user may select one of the displayed telephone numbers as information on an opponent. Meanwhile, in describing FIG. 9, the case in which one telephone number in the displayed list is selected as the opponent image forming apparatus is described, but in the implementation, a plurality of telephone numbers may be selected. Further, a user may also receive a telephone number directly.

Figure 10:
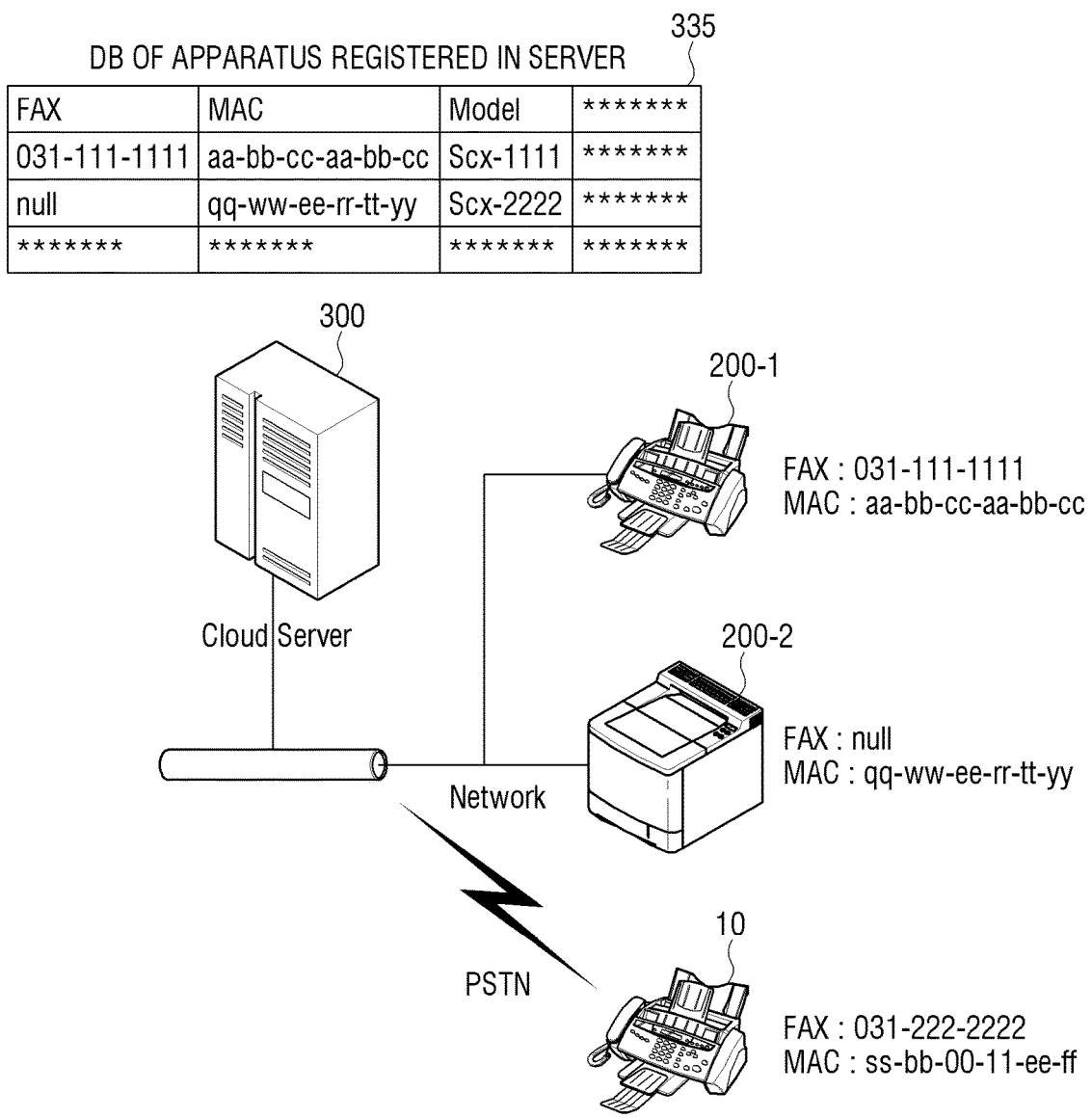
FIG. 10 is a diagram for describing a determination operation of a cloud server according to an embodiment of the present disclosure.

FIG. 10 is a diagram for describing a determination operation of the cloud server.

Referring to FIG. 10, when receiving a question about the fax transmission from the user terminal device 100 or the image forming apparatus 200, the cloud server 300 may answer whether the opponent image forming apparatuses 200-1, 200-2, and 10 can use SCP or are currently connected to the cloud server 300. In this case, it may be determined whether the SCP can be used by referring to the pre-stored mapping table 335.

Further, the cloud server 300 receives an image and information (telephone number, name) of an opponent and then may transmit data to the pre-registered internet address when the opponent image apparatus is registered in the mapping table 335 as the apparatuses 200-1 and 200-2 to which fax may be transmitted through the internet network. In this case, the image forming apparatuses 200-1 and 200-2 receiving data through the internet network do the user authentication (NFC authentication, card authentication, user password authentication) and may output the received data to the authenticated user.

If the opponent fax device 10 is not an apparatus to which fax may be transmitted through the internet network, the cloud server 300 directly transmits fax through the PSTN network. In detail, the received data are changed to fax support formats (MH/MR/MMR/JBIG/JPEG) and then fax may be transmitted through the PSTN network.

Further, the cloud server 300 receives the fax transmission result and may store the result in a history report therein. Further, when receiving the request of the fax transmission result, the cloud server 300 may notify the user terminal device 100 or the image forming apparatus 200 actually requesting the fax transmission of the transmission result.

Figure 11:
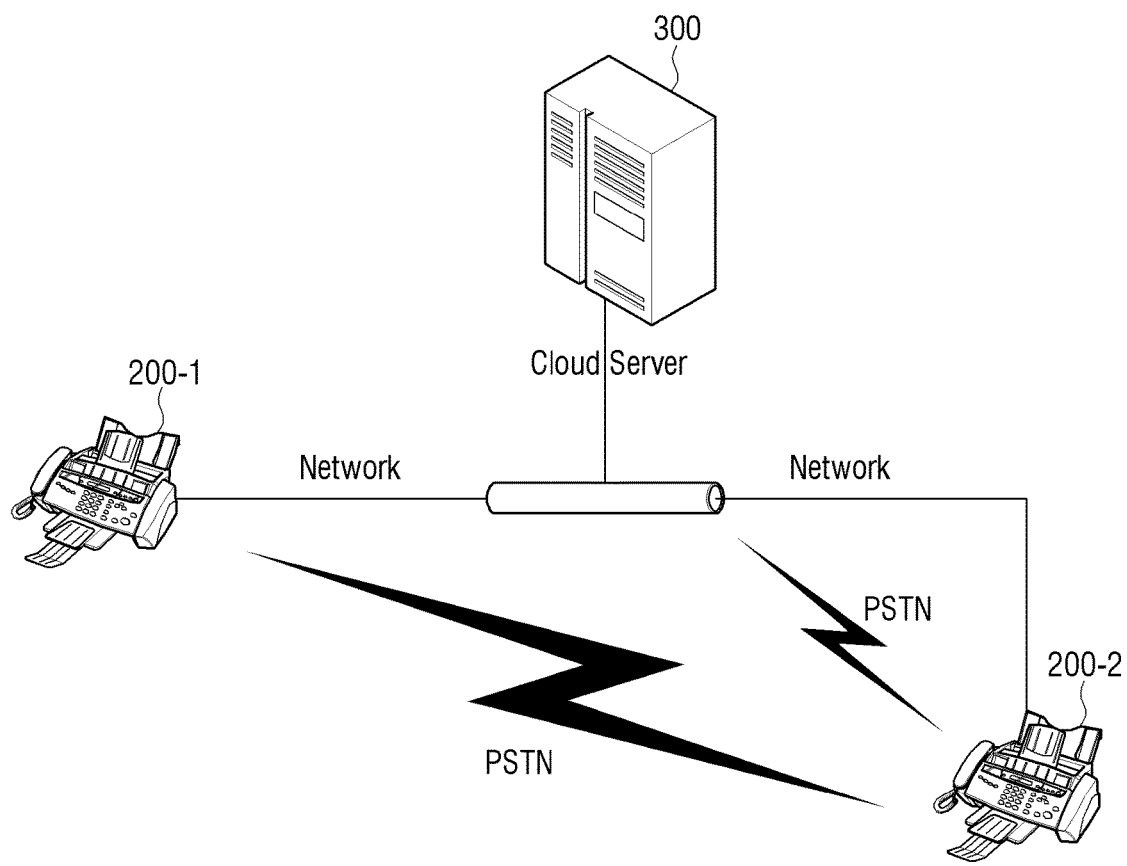
FIG. 11 is a diagram for describing a fax transmission operation when data may be transmitted through both an internet network and a public switched telephone network (PSTN) network.

FIG. 11 is a diagram for describing a fax transmission operation when data may be transmitted through both an internet network and a PSTN network.

Referring to FIG. 11, first, the image forming apparatus 200-1 may use the SCP application to select a picture or a document and select an opponent fax number. Further, the image forming apparatus 200-1 transmits the selected fax number to the cloud server 300.

The cloud server 300 confirms whether the requested opponent information is the fax number registered in the server and may transmit the result to the image forming apparatus 200-1.

In this case, if the opponent image forming apparatus 200-2 is registered in the cloud server 300, the cloud server 300 may transmit the received image or document to the image forming apparatus 200-2 through a network (that is, internet network). The image forming apparatus 200-2 receiving content may print the content after going through the user authentication process.

Even though the image forming apparatus is registered in the cloud server 300, when the user requests the transmission by the PSTN scheme, the cloud server 300 changes the received image or document so that the received image or document meets the fax format and then may transmit the changed image or document to the image forming apparatus 200-2 through the PSTN.

Further, the image forming apparatus 200-1, not the cloud server 300, may also transmit the changed image or document to the image forming apparatus 200-2 through the PSTN, like the existing general fax transmission scheme.

Meanwhile, when the fax transmission command is issued from the user, the case of directly determining whether the opponent image forming apparatus is registered in the cloud server 300 is illustrated and described, but in the implementation, when a communication error occurs during the fax transmission from the first image forming apparatus 200-1 to the second image forming apparatus 200-2 by the PSTN scheme, the opponent queries the cloud server 300 whether fax can be transmitted through the internet network and if it is determined that fax can be transmitted through the internet network, the foregoing operation may be performed.

Figure 12:
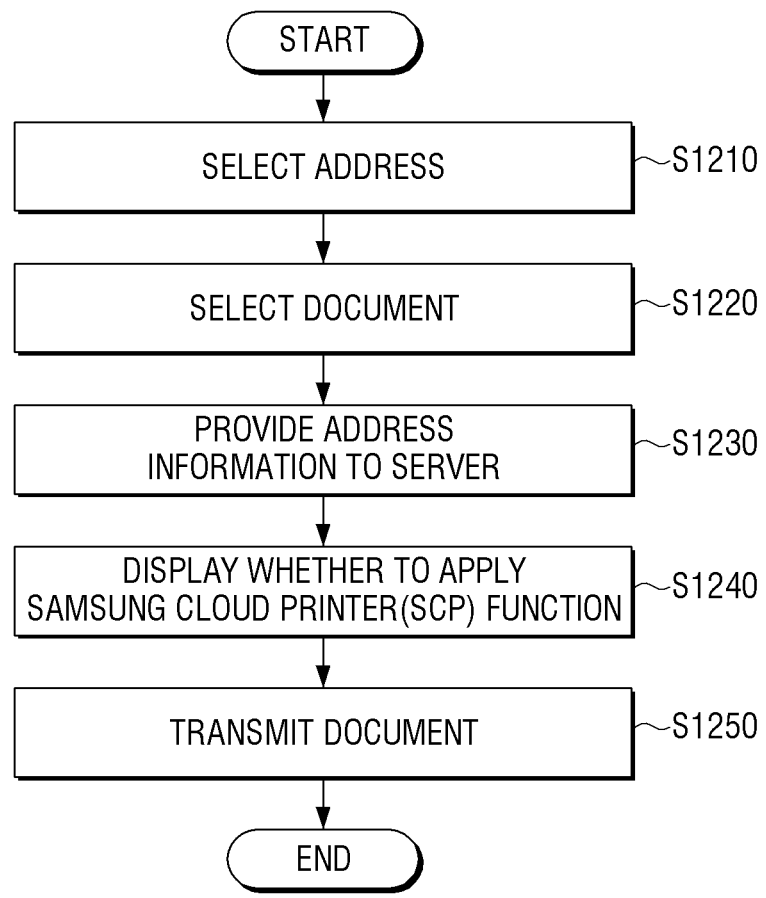
FIG. 12 is a flow chart for describing a method for transmitting fax by a user terminal device according to an embodiment of the present disclosure.

FIG. 12 is a flow chart for describing a method for transmitting fax by a user terminal device according to an embodiment of the present disclosure.

Referring to FIG. 12, first, the fax address information of the opponent image forming apparatus to which data is transmitted is received from a user at operation S1210. In detail, the user terminal device 100 may display the information on the pre-stored telephone numbers and may select one of the displayed telephone numbers as the fax address information of the opponent image forming apparatus to which data will be transmitted. Alternatively, the user terminal device 100 may display a keypad capable of receiving a numeric key and receive the direct fax address information through the keypad. Here, the fax address information may be a telephone number, but if the fax address information is information that may specify the opponent image forming apparatus, may be a MAC address, an IP address, a domain name, an e-mail address besides a telephone number.

Further, the data to be transmitted are selected at operation S1220. In detail, the user terminal device 100 may display the pre-stored document list and one of them may be selected by a user. Alternatively, a new generation command (for example, imaging command) is received, a new content is generated according to the command, and the generated content may also be selected as the data to be transmitted.

Further, the input fax address information is transmitted to the cloud server 300 at operation S1230. In detail, the fax address information input through the connected internet network may be transmitted to the cloud server 300. Accordingly, the determination result on whether the opponent image forming apparatus is a pre-registered apparatus may be received from the cloud server 300.

Further, the received determination result is displayed at operation S1240. Further, if a command to progress a fax job by a scheme corresponding to the displayed determination result is received, the selected data are transmitted to the cloud server 300 at operation S1250.

As described above, the method for transmitting fax by a user terminal device according to the embodiment of the present disclosure may transmit a fax even when the user terminal device does not include a fax module, thereby improving the user convenience. Further, the method for transmitting a fax by a user terminal device according to the embodiment of the present disclosure may transmit the fax through the internet network, thereby saving the communication fee and transmitting the manuscript data with the high quality of image. The method for transmitting fax as illustrated in FIG. 12 may be performed on the user terminal device having the configuration of FIG. 2 or 3 and may also be performed even on the user terminal device having other configurations.

Further, the user terminal device method as described above may be implemented in programs (or applications) including algorithm which may be executed in a computer and the programs may be provided while being stored in a non-transitory computer readable medium. For example, the program is implemented as applications and may be stored in the server like an app store. The applications stored in the server are downloaded by the user of the electronic device and thus may be installed in the electronic device.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disc (DVD), a hard disk, a Blu-ray disk, a universal serial bus (USB), a memory card, and a read only memory (ROM).

Figure 13:
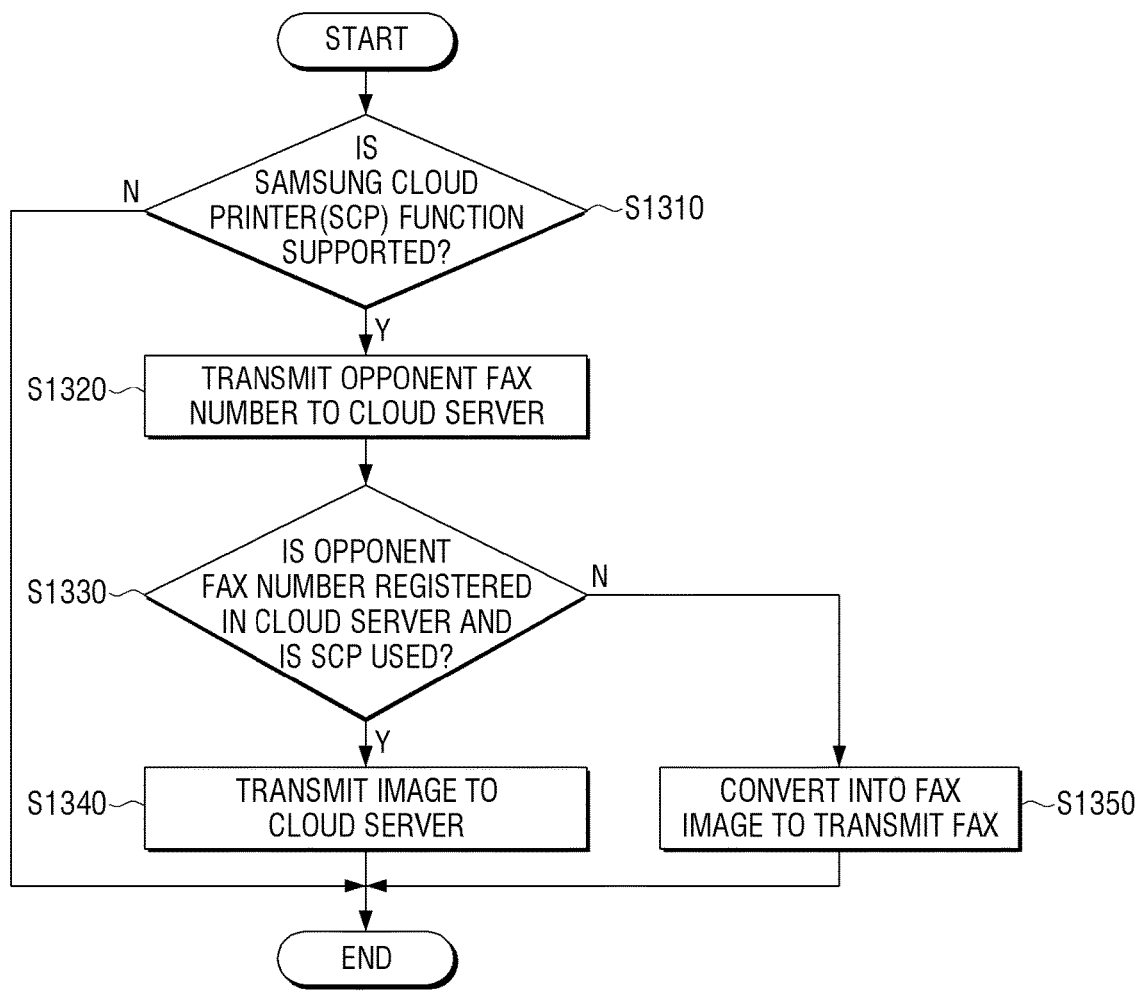
FIG. 13 is a flow chart for describing a method for transmitting fax by an image forming apparatus according to a first embodiment of the present disclosure.
Figure 14:
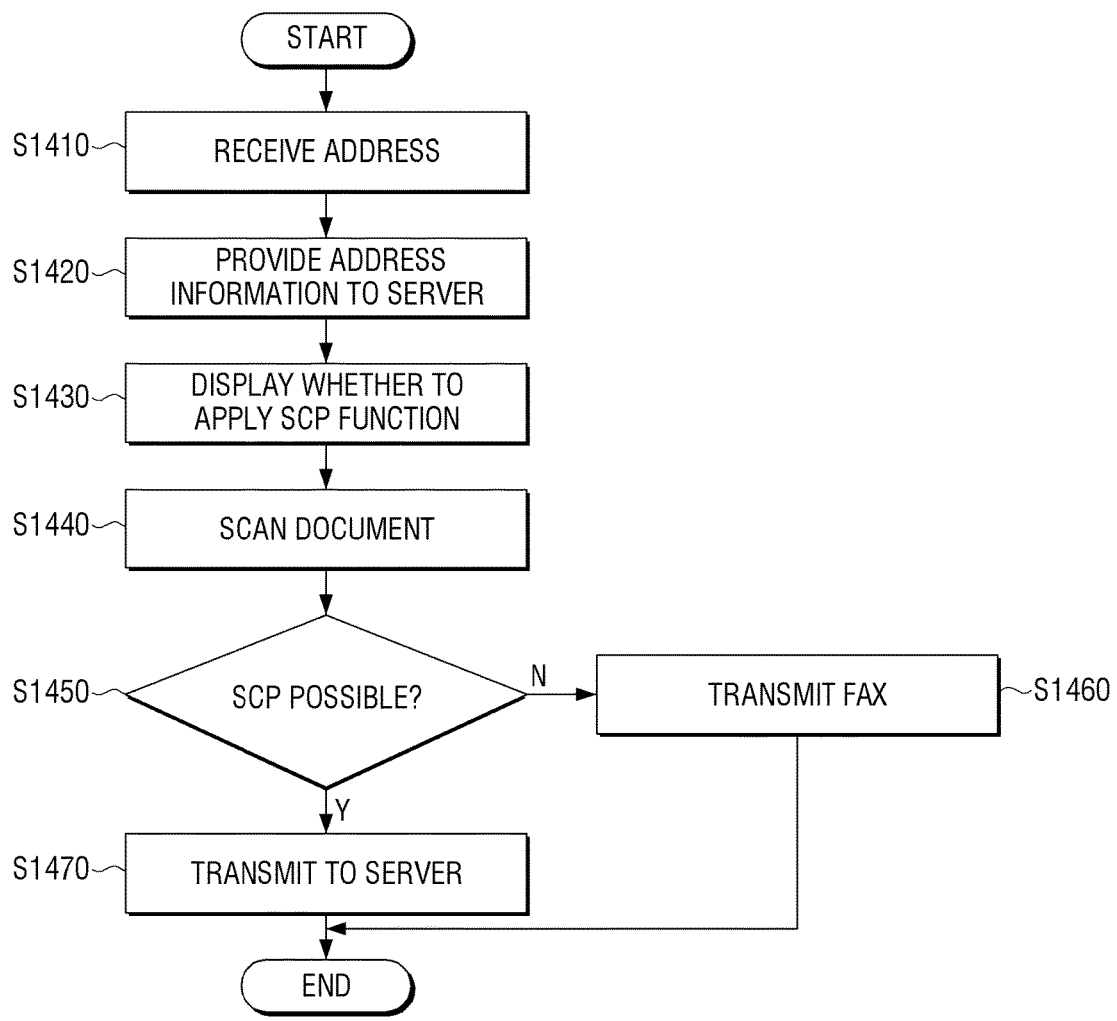
FIG. 14 is a flow chart for describing a method for transmitting fax by an image forming apparatus according to a second embodiment of the present disclosure.

FIGS. 13 and 14 are diagrams for describing the method for transmitting fax by an image forming apparatus of the present disclosure. In detail, FIG. 13 is a flow chart for describing a method for transmitting fax by an image forming apparatus that does not include a fax module and FIG. 14 is a flow chart for describing a method for transmitting fax by an image forming apparatus that includes a fax module.

Referring to FIG. 13, it is determined whether the image forming apparatus 200 supports the SCP function at operation S1310. Here, the SCP function is function of using the internet network and the cloud server 300 instead of using the PSTN network to transmit the fax data to the receiving side. Therefore, it may be determined whether the image forming apparatus 200 supports the SCP function by comprehensively considering whether the image forming apparatus 200 includes the applications for performing the corresponding function, whether the image forming apparatus 200 may be connected to the internet, whether the cloud server 300 is operated, or the like.

If the SCP function is not supported at operation S1310-N, the operation of the image forming apparatus 200 ends.

If the SCP function is supported at operation S1310-Y, the image forming apparatus 200 transmits the opponent fax number to the cloud server 300 at operation S1320. Accordingly, the determination result on whether the image forming apparatus corresponding to the opponent fax number supports the SCP function is notified from the cloud server 300.

Therefore, as the determination result, if the opponent fax number is registered in the cloud server 300 at operation S1330-Y, the scan image or the fax data may be transmitted to the cloud server 300 at operation S1340.

As the determination result, if the opponent fax number is not registered in the cloud server 300 at operation S1330-N, the image forming apparatus 200 converts data into the data of the fax format and may transmit the converted data to the cloud server 300. Meanwhile, in the implementation, the conversion into the fax format may also be performed by the cloud server 300.

As described above, the method for transmitting fax by an image forming apparatus according to the embodiment of the present disclosure may transmit a fax even when the image forming apparatus does not include a fax module, thereby improving the user convenience. Further, the method for transmitting a fax by an image forming apparatus according to the embodiment of the present disclosure may transmit the fax through the internet network, thereby saving the communication fee and transmitting the manuscript data with the high quality of image. The method for transmitting a fax as illustrated in FIG. 13 may be performed on the image forming apparatus having the configuration of FIG. 5 and may also be performed on the image forming apparatus having other configurations.

Further, the method for transmitting a fax by an image forming apparatus as described above may be implemented in programs (or applications) including algorithm which may be executed in a computer and the programs may be provided while being stored in a non-transitory computer readable medium.

Referring to FIG. 14, first, the fax address information of the opponent image forming apparatus to which data will be transmitted is received from a user at operation S1410. In detail, the user terminal device 100 may display the information on the pre-stored telephone numbers and may select one of the displayed telephone numbers as the fax address information of the opponent image forming apparatus to which data will be transmitted. Alternatively, the user terminal device 100 may display a keypad capable of receiving a numeric key and receive the direct fax address information through the keypad. Here, the fax address information may be a telephone number, but if the fax address information is information that may specify the opponent image forming apparatus, may be a MAC address, an IP address, a domain name, an e-mail address. Further, the data to be transmitted are selected. In detail, the user terminal device may display the pre-stored document list and one of them may be selected by a user. Alternatively, a new generation command (for example, imaging command) is received, a new content is generated according to the command, and the generated content may also be selected as the data to be transmitted.

Further, the input fax address information is transmitted to the cloud server 300 at operation S1420. In detail, the fax address information input through the connected internet network may be transmitted to the cloud server 300. Accordingly, the determination result on whether the opponent image forming apparatus is a pre-registered apparatus may be received from the cloud server 300.

Further, the received determination result is displayed at operation S1430. Further, if a command to progress a fax job by a scheme corresponding to the displayed determination result is received, the selected data are transmitted to the cloud server 300 at operations S1450-Y and S1470. Otherwise, a fax is transmitted through the PSTN at operations S1450-N and S1460

As described above, the method for transmitting a fax by an image forming apparatus according to the embodiment of the present disclosure may transmit a fax even when the image forming apparatus does not include the fax module, thereby improving the user convenience. Further, the method for transmitting a fax by an image forming apparatus according to the embodiment of the present disclosure may transmit the fax through the internet network, thereby saving the communication fee and transmitting the manuscript data with the high quality of image. The method for transmitting a fax as illustrated in FIG. 14 may be performed on the image forming apparatus having the configuration of FIG. 5 and may also be performed on the image forming apparatus having other configurations.

Further, the method for transmitting fax by an image forming apparatus as described above may be implemented in programs (or applications) including algorithm which may be executed in a computer and the programs may be provided while being stored in a non-transitory computer readable medium.

Figure 15:
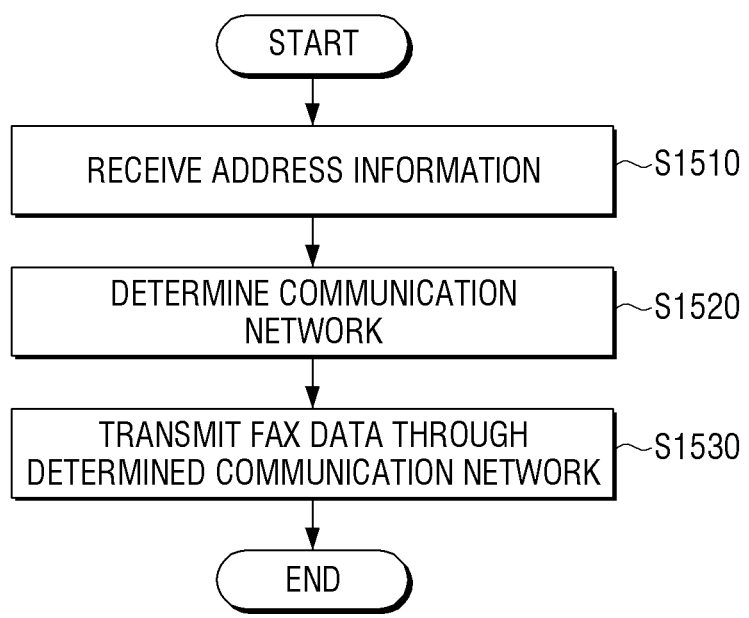
FIG. 15 is a flow chart for describing a method for transmitting fax by a cloud server according to an embodiment of the present disclosure.

FIG. 15 is a flow chart for describing a method for transmitting fax by a cloud server according to an embodiment of the present disclosure.

Referring to FIG. 15, the fax address information is received from the user terminal device 100 or the image forming apparatus 200 at operation S1510. In detail, the fax transmission request including the fax address information may be received from the user terminal device or the image forming apparatus.

Further, the processor 320 determines the communication network to be used for communication with the opponent image forming apparatus, among the PSTN network and the internet network depending on whether the opponent image forming apparatus corresponding to the fax transmission request is a pre-registered apparatus at operation S1520. In detail, it may be determined whether the opponent image forming apparatus is a pre-registered apparatus depending on whether the fax address of the opponent image forming apparatus is registered in the pre-stored mapping table for the fax addresses and the internet addresses of the plurality of image forming apparatuses, respectively, that may be connected to the internet network. Further, the determination result may be notified to the user terminal device or the image forming apparatus that transmits the fax transmission request.

Further, if the opponent image forming apparatus is a pre-registered apparatus, the internet network may be determined as the communication network to be used for communication with the opponent image forming apparatus. On the other hand, if the opponent image forming apparatus is not a pre-registered apparatus, the PSTN network may be determined as the communication network to be used for communication with the opponent image forming apparatus. In this case, when the received data do not have the fax format, the cloud server 300 may convert the data received from the user terminal device or the image forming apparatus into the fax data of the fax format.

Further, the fax data corresponding to the fax transmission request are transmitted to the opponent image forming apparatus by using the determined communication network at operation S1530.

As described above, the method for transmitting fax by a cloud server according to the embodiment of the present disclosure may transmit a fax even by the request of an apparatus that does not include a fax module, thereby improving the user convenience. Further, when the opponent image forming apparatus may not use the internet network, the cloud server may transmit fax using the PSTN network, and therefore has wide versatility. Further, when the opponent image forming apparatus is connected to the internet network, the cloud server may transmit the fax through the internet network, thereby saving the communication fee and transmitting the manuscript data with the high quality of image. The method for transmitting fax as illustrated in FIG. 15 may be performed on the cloud server having the configuration of FIG. 6 or 7 and may also be performed even on the cloud server having other configurations.

Further, the method for transmitting fax by a cloud server as described above may be implemented in programs (or applications) including algorithm which may be executed in a computer and the programs may be provided while being stored in a non-transitory computer readable medium.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. A cloud server, comprising:
a transceiver to receive, from an electronic device, fax data and a fax transmission request, the fax transmission request including fax address information of an opponent image forming apparatus;
at least one processor to:
determine whether the opponent image forming apparatus is a pre-registered apparatus,
determine a communication network among a plurality of communication networks for communication with the opponent image forming apparatus corresponding to the fax transmission request; when it is determined that the opponent image forming apparatus is the pre-registered apparatus,
control the transceiver to transmit the fax data to the opponent image forming apparatus using the determined communication network when the opponent image forming apparatus is the pre-registered apparatus, and
control the transceiver to transmit the fax data to the opponent image forming apparatus using a public switched telephone network (PSTN) when the opponent image forming apparatus is not the pre-registered apparatus; and
an image processor to:
convert the fax data into a fax format when the determined communication network is the PSTN, and
convert the fax data into a printing format when the determined communication network is an internet network.

2. The cloud server as claimed in claim 1, further comprising:
a storage to store a mapping table for mapping a plurality of image forming apparatuses to at least one of a fax address and an internet address,
wherein the at least one of the fax address and the internet address is connected to the internet network, and
wherein the at least one processor determines that the opponent image forming apparatus is a pre-registered apparatus when a fax address or an internet address of the opponent image forming apparatus corresponding to the fax transmission request is mapped in the mapping table.

3. The cloud server as claimed in claim 2, wherein the internet address mapped in the mapping table is one of an internet protocol (IP) address, a medium access control (MAC) address, and a virtual telephone number.

4. The cloud server as claimed in claim 2, wherein the at least one processor controls the transceiver to notify the electronic device of a determination result on whether the opponent image forming apparatus is the pre-registered apparatus.

5. The cloud server as claimed in claim 1, wherein the at least one processor controls the transceiver to transmit user authentication information with the fax data to the opponent image forming apparatus when the determined communication network is the internet network.

6. The cloud server as claimed in claim 1, wherein the transceiver receives data from the electronic device through the internet network.

7. The cloud server as claimed in claim 1, further comprising:
a storage to store a history of the fax transmission request.

8. The cloud server as claimed in claim 1, wherein the plurality of communication networks include the PSTN and the internet network.

9. The cloud server as claimed in claim 1, wherein the electronic device is one of a user terminal device or an image forming apparatus.

10. An electronic device connected to a cloud server, comprising:
an input interface to receive fax address information of an opponent image forming apparatus;
a transceiver to:
transmit the fax address information to the cloud server, and
receive a determination result from the cloud server on whether the opponent image forming apparatus is a pre-registered apparatus and whether the cloud server determined, by a processor of the cloud server, a communication network among a plurality of communication networks for communication with the opponent image forming apparatus corresponding to the fax address information;
a display to display the received determination result;
a scanner to scan a manuscript to generate a scan image; and
at least one processor to:
convert the generated scan image into a printing format when the opponent image forming apparatus is pre-registered in the cloud server,
convert the generated scan image into a fax format when the opponent image forming apparatus is not pre-registered in the cloud server, and
control the transceiver to transmit the converted scan image to the cloud server.

11. The electronic device as claimed in claim 10, further comprising:
a fax device to transmit the generated scan image to the opponent image forming apparatus through a public switched telephone network (PSTN) network when the opponent image forming apparatus is not pre-registered in the cloud server.

12. The electronic device as claimed in claim 10, further comprising:
an image former,
wherein the transceiver receives fax data from the cloud server, and
wherein the image former prints the fax data received from the cloud server.

13. The electronic device as claimed in claim 12, further comprising:
a storage to store the fax data and user information from the cloud server,
wherein the at least one processor controls the image former to print the fax data stored in the storage when authentication information corresponding to the user information is input.

14. A method for transmitting fax by a cloud server, the method comprising:
receiving, by a transceiver, fax data and a fax transmission request from an electronic device;
receiving, by the transceiver, fax address information of an opponent image forming apparatus, included in the fax transmission request, from the electronic device;
determining whether the opponent image forming apparatus is a pre-registered apparatus;
determining a communication network among a plurality of communication networks for communication with the opponent image forming apparatus corresponding to the fax transmission request when it is determined that the opponent image forming apparatus is the pre-registered apparatus;
transmitting the fax data to the opponent image forming apparatus using the determined communication network, when the opponent image forming apparatus is the pre-registered apparatus;
transmitting the fax data to the opponent image forming apparatus using a public switched telephone network (PSTN) when the opponent image forming apparatus is not the pre-registered apparatus;
converting the fax data into a fax format when the determined communication network is the PSTN; and
converting the fax data into a printing format when the determined communication network is an internet network.

15. The method as claimed in claim 14, wherein the determining of whether the opponent image forming apparatus is a pre-registered apparatus comprises:
determining that the opponent image forming apparatus is a pre-registered apparatus when a fax address or an internet address of the opponent image forming apparatus corresponding to the fax transmission request is mapped in a pre-stored mapping table for mapping a plurality of image forming apparatuses to at least one of a fax address and an internet address internet.

16. The method as claimed in claim 15, wherein the internet address mapped in the mapping table is one of an internet protocol (IP) address, a medium access control (MAC) address, and a virtual telephone number.

17. The method as claimed in claim 15, further comprising:
  notifying the electronic device of a determination result on whether the opponent image forming apparatus is a pre-registered apparatus.

18. The method as claimed in claim 14, wherein the electronic device is one of a user terminal device or an image forming apparatus.

* * * * *